United States Patent
Peper et al.

(10) Patent No.: US 11,405,072 B2
(45) Date of Patent: Aug. 2, 2022

(54) COMMUNICATION METHOD AND NETWORK SYSTEM

(71) Applicants: NATIONAL INSTITUTE OF INFORMATION AND COMMUNICATIONS TECHNOLOGY, Tokyo (JP); TOKYO UNIVERSITY OF SCIENCE FOUNDATION, Tokyo (JP)

(72) Inventors: Ferdinand Peper, Koganei (JP); Kenji Leibnitz, Koganei (JP); Tetsuya Shimokawa, Koganei (JP); Mikio Hasegawa, Tokyo (JP); Kaori Kuroda, Tokyo (JP)

(73) Assignees: NATIONAL INSTITUTE OF INFORMATION AND COMMUNICATIONS TECHNOLOGY, Tokyo (JP); TOKYO UNIVERSITY OF SCIENCE FOUNDATION, Tokyo (JP)

( * ) Notice: Subject to any disclaimer, the term of this patent is extended or adjusted under 35 U.S.C. 154(b) by 0 days.

(21) Appl. No.: 17/260,752

(22) PCT Filed: Jul. 16, 2019

(86) PCT No.: PCT/JP2019/027849
§ 371 (c)(1),
(2) Date: Jan. 15, 2021

(87) PCT Pub. No.: WO2020/017484
PCT Pub. Date: Jan. 23, 2020

(65) Prior Publication Data
US 2021/0328623 A1 Oct. 21, 2021

(30) Foreign Application Priority Data

Jul. 17, 2018 (JP) ............................ JP2018-134365

(51) Int. Cl.
*H04B 1/7176* (2011.01)
*H04L 25/49* (2006.01)

(52) U.S. Cl.
CPC ....... *H04B 1/7176* (2013.01); *H04L 25/4902* (2013.01)

(58) Field of Classification Search
CPC .................... H04B 1/7176; H04L 25/4902
See application file for complete search history.

(56) References Cited

U.S. PATENT DOCUMENTS

| 2002/0196845 A1 | 12/2002 | Richards et al. |
| 2003/0108133 A1 | 6/2003 | Richards |

(Continued)

FOREIGN PATENT DOCUMENTS

| EP | 1956734 A1 | 8/2008 |
| EP | 2082488 A2 | 7/2009 |

(Continued)

OTHER PUBLICATIONS

Zhu et al., "Challenges: Communication through Silence in Wireless Sensor Networks," Mob iCom '05 Proceedings of the 11th Annual International Conference on Mobile Computing and Networking (2005).

(Continued)

*Primary Examiner* — Sam K Ahn
*Assistant Examiner* — Amneet Singh
(74) *Attorney, Agent, or Firm* — Marshall, Gerstein & Borun LLP

(57) ABSTRACT

A communication method includes generating at a first node, a message of a predetermined message temporal length that indicates an input value to be encoded and transmitting, at the first node, a signal including a pulse train corresponding to the generated message. The signal including the pulse train includes two pulses that define start and end of the (Continued)

message, respectively, and further two pulses that define within the message, a first time interval calculated from the input value in accordance with a first function and a second time interval calculated from the input value in accordance with a second function, respectively.

10 Claims, 30 Drawing Sheets

(56) References Cited

U.S. PATENT DOCUMENTS

| | | |
|---|---|---|
| 2008/0117804 A1 | 5/2008 | Ekbal et al. |
| 2008/0117939 A1* | 5/2008 | Ekbal ................. H04B 1/71632 370/517 |
| 2010/0002749 A1 | 1/2010 | Maggio et al. |
| 2015/0023447 A1 | 1/2015 | Kondo et al. |
| 2016/0191084 A1 | 6/2016 | Kim et al. |

FOREIGN PATENT DOCUMENTS

| | | |
|---|---|---|
| JP | 2010-510726 A | 4/2010 |
| KR | 20140000824 A | 1/2014 |
| WO | WO-2008061245 A2 | 5/2008 |
| WO | WO-2013/129277 A1 | 9/2013 |

OTHER PUBLICATIONS

European Search Report issued in European Patent Application No. 19838455.4 dated Mar. 30, 2022.

* cited by examiner

FIG.3
(A)
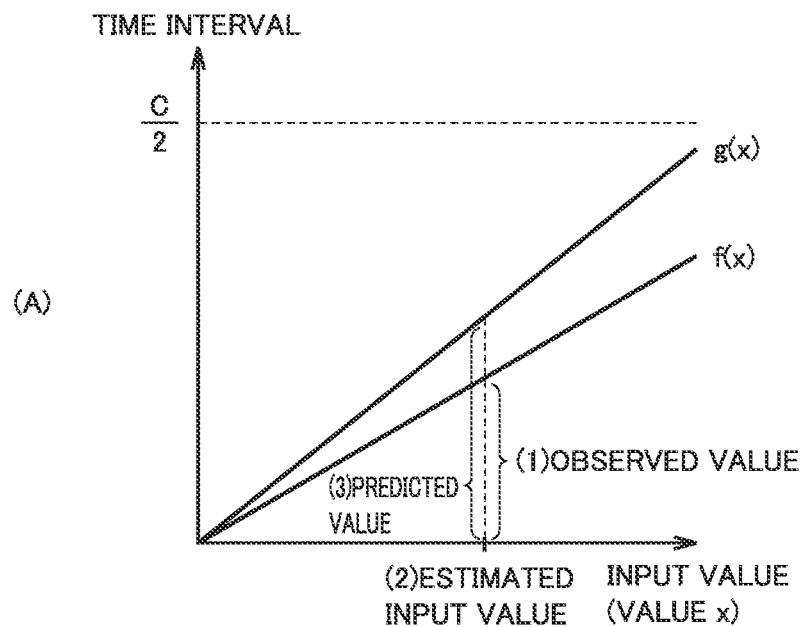
(B)
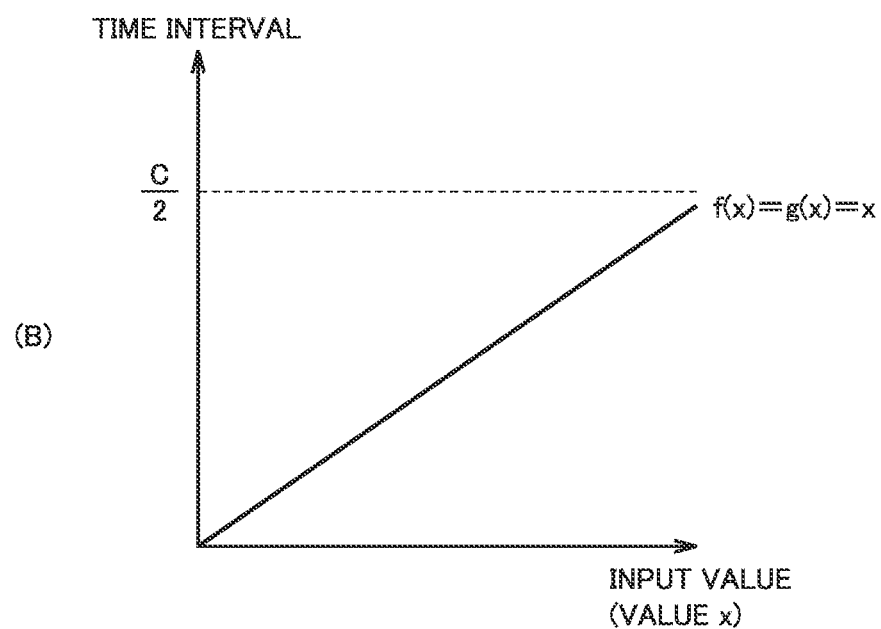

COMMUNICATION METHOD AND NETWORK SYSTEM

TECHNICAL FIELD

The present technology relates to a communication scheme and a network system with which data is transmitted between a plurality of nodes by a signal including a pulse train.

BACKGROUND ART

Various encoding schemes for transmitting information by a signal including pulses have been known. For example, on-off keying (OOK) is a scheme for binary encoding of "0" and "1"; for example, binary "1" is encoded as indicating presence of a pulse and "binary "0" is encoded as indicating silence (absence of a pulse).

Pulse-position modulation (PPM) refers to a scheme for encoding a value based on a pulse position in a signal. More specifically, an amount of shift from a reference position or a reference phase of a pulse indicates a value of each codeword.

Furthermore, differential pulse-position modulation (DPPM) refers to a scheme for encoding a value based on a time difference between two successive pulses. Differential pulse-position modulation is also referred to as communication through silence (CIS) and a duration for which a pulse is absent indicates a value of a codeword (see, for example, NPL 1).

CITATION LIST

Non Patent Literature

NPL 1: Yujie Zhu and Raghupathy Sivakumar, "Challenges: communication through silence in wireless sensor networks," MobiCom '05 Proceedings of the 11th annual international conference on Mobile computing and networking, Pages 140-147

SUMMARY OF INVENTION

Technical Problem

Though NPL 1 discloses possibility of multiplexing of a plurality of messages encoded in accordance with DPPM at an overlapping interval or an equal interval, it fails to disclose how to implement multiplexing. Furthermore, NPL 1 is also silent about how to decode such multiplexed messages.

An object of the present technology is to provide a communication scheme and a network system that allow efficient encoding and decoding by using a signal including a pulse train.

Solution to Problem

According to one aspect of the present invention, a communication method of transmitting data between a plurality of nodes by a signal including a pulse train is provided. The communication method includes generating, at a first node, a message of a predetermined message temporal length that indicates an input value to be encoded, and transmitting, at the first node, a signal including a pulse train corresponding to the generated message. The signal including the pulse train includes two pulses that define start and end of the message, respectively, and further two pulses that define within the message, a first time interval calculated from the input value in accordance with a first function and a second time interval calculated from the input value in accordance with a second function.

The communication method may further include reproducing, at a second node, the message from the received signal including the pulse train, by determining a set of four pulses that matches in the first time interval, the second time interval, and the message temporal length with the received signal, in respect to time intervals defined by the four pulses.

The first function and the second function may be a monotonously increasing function or a monotonously decreasing function with respect to the input value.

The first time interval and the second time interval may both be set to an identical value that indicates the input value.

The communication method may further include transmitting, at the first node, a message indicating an identical input value a plurality of times. The transmitting the message the plurality of times may include randomly determining a time interval from transmission of a preceding message until transmission of a next message.

According to another aspect of the present invention, a network system that transmits data between a plurality of nodes by a signal including a pulse train is provided. The network system includes a first node that generates a message of a predetermined message temporal length that indicates an input value to be encoded and a second node that decodes the message transmitted from the first node. The first node transmits a signal including a pulse train corresponding to the generated message. The signal including the pulse train includes two pulses that define start and end of the message, respectively, and further two pulses that define within the message, a first time interval calculated from the input value in accordance with a first function and a second time interval calculated from the input value in accordance with a second function.

Advantageous Effects of Invention

According to the present invention, a communication scheme and a network system that allow efficient encoding and decoding by using a signal including a pulse train can be realized.

BRIEF DESCRIPTION OF DRAWINGS

FIG. 3 is a diagram for illustrating an exemplary function for determining a time interval used in the communication method according to the present embodiment.

DESCRIPTION OF EMBODIMENTS

Figure 1:
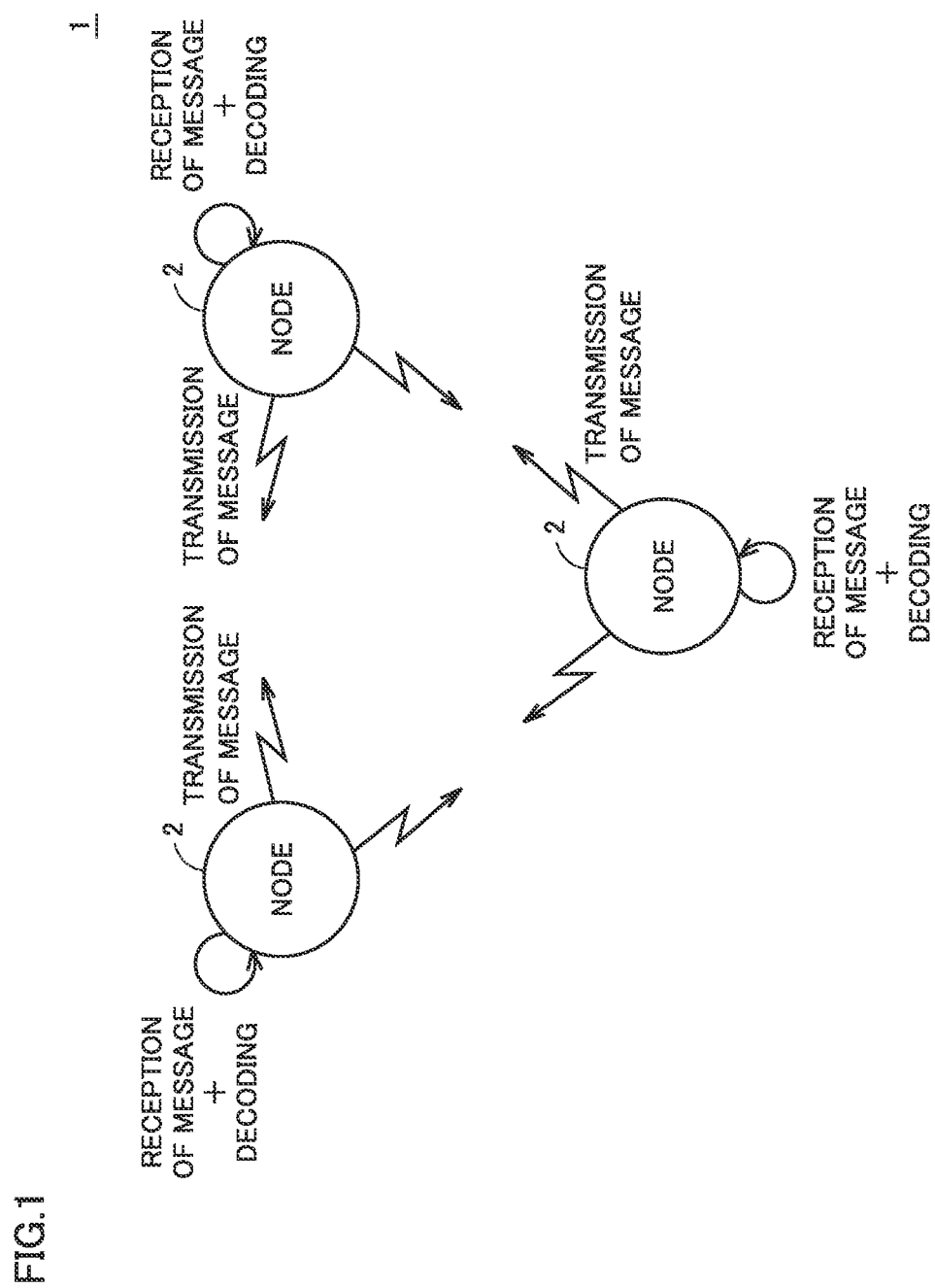
FIG. 1 is a schematic diagram showing an exemplary network system that adopts a communication method according to the present embodiment.

An embodiment of the present invention will be described in detail with reference to the drawings. The same or corresponding elements in the drawings have the same reference characters allotted and description thereof will not be repeated.

A. Network System

Overview of a network system that adopts a communication method according to the present embodiment will initially be described. In the communication method according to the present embodiment, data is transmitted between a plurality of nodes by a signal including a pulse train.

FIG. 1 is a schematic diagram showing an exemplary network system 1 that adopts the communication method according to the present embodiment. Referring to FIG. 1, network system 1 includes a plurality of nodes 2. Each node 2 transmits a message generated by encoding data to be transmitted to another node 2, and decodes data from the message received from another node 2.

In the present embodiment, each "message" means unit data obtained by encoding one value. A range of values held in each message is arbitrarily determined by a temporal length of each message and a temporal resolution for the temporal length. In the description below, a lime interval included in a message is assumed as a continuous time for the sake of convenience.

Typically, each node 2 alternately repeats any mode of message transmission and message reception and a sleep (stop) mode. More specifically, switching between the modes is made in such an order as message transmission or reception (any one being randomly determined), sleep (a sleep period being randomly determined), message transmission or reception (any one being randomly determined), sleep (a sleep period being randomly determined), . . . By adopting such switching between modes, timing of start of a message transmission period randomly varies so that a message from another node 2 can correctly be received at each node 2. A message transmission period and a message reception period can each be set to a predetermined constant length.

A reception circuit and a transmission circuit may independently be implemented at each node 2. In this case, transmission and reception of a message can simultaneously be carried out at each node 2.

Though FIG. 1 shows an exemplary configuration of network system 1 in which a message is exchanged by a wireless signal as a typical example, a message may be exchanged by a wireline signal.

B. Overview

Overview of the communication method according to the present embodiment will now be described.

(b1: Message Code Format)

Figure 2:
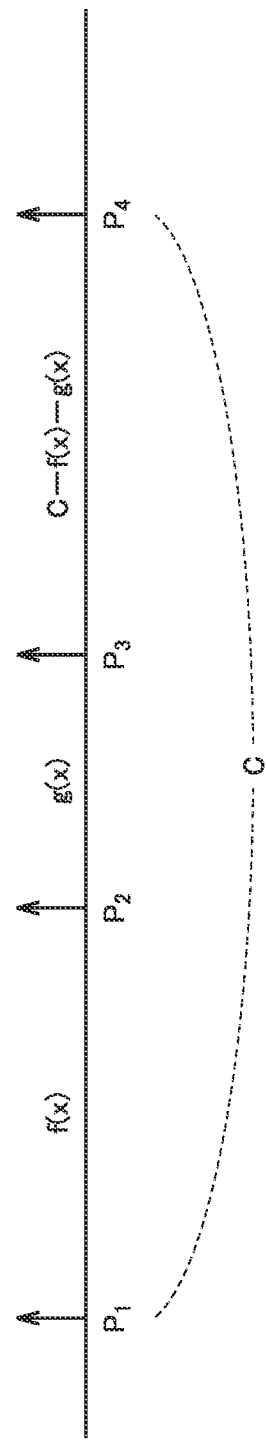
FIG. 2 is a diagram for illustrating overview of a code format of a message used in the communication method according to the present embodiment.

FIG. 2 is a diagram for illustrating overview of a code format of a message used in the communication method according to the present embodiment. Referring to FIG. 2, in the communication method according to the present embodiment, a value x is encoded by defining three time intervals $f(x)$, $g(x)$, and $C-f(x)-g(x)$ within a message temporal length C set to a predetermined fixed value. These three time intervals are defined by four successive pulses $P_1$, $P_2$, $P_3$, and $P_4$.

By way of example, pulses $P_1$ and $P_4$ are arranged at opposing ends of message temporal length C. The time interval between pulse $P_1$ and pulse $P_2$ corresponds to $f(x)$, the time interval between pulse $P_2$ and pulse $P_4$ corresponds to $g(x)$, and the time interval between pulse $P_3$ and pulse $P_4$ corresponds to $C-f(x)-g(x)$.

Unlike conventional differential pulse-position modulation (DPPM) or CtS, one value is encoded by using a plurality of time intervals and hence redundancy is achieved. More specifically, in conventional differential pulse-position modulation (DPPM) or CtS, one value is encoded with two pulses, whereas in the communication method according to the present embodiment, four pulses (addition of two pulses) twice as many as pulses in the conventional example are used so that an error correction function that could not have been achieved in the conventional scheme can be provided.

The order of $f(x)$, $g(x)$, and $C-(x)-g(x)$ is not limited to the order shown in FIG. 2. For example, arrangement may be in the order of $C$ $f(x)$ $g(x)$, $f(x)$, and $g(x)$, or in the order of $f(x)$, $C-f(x)-g(x)$, and $g(x)$.

As shown in FIG. 2, a sender node generates a message of predetermined message temporal length C that indicates an input value to be encoded, and transmits a signal including a pulse train corresponding to the generated message.

FIG. 3 is a diagram for illustrating an exemplary function for determining a time interval used in the communication method according to the present embodiment.

As shown in FIG. 3(A), by setting a function that defines time interval $f(x)$ and time interval $g(x)$ as a monotonously increasing function or a monotonously decreasing function with respect to a value x which is an input value to be encoded, a length of time interval $f(x)$ and time interval $g(x)$ can uniquely be associated with value x.

The time interval between pulse $P_1$ and pulse $P_2$ can be observed by receiving pulse $P_1$ and pulse $P_2$ shown in FIG. 2 ((1) observed value). Value x can be estimated from an inverse function of time interval $f(x)$ based on (1) observed value ((2) estimated input value). Furthermore, a time interval to be observed next can be estimated from time interval $g(x)$ based on (2) estimated input value ((3) predicted value). (3) Predicted value defines timing to receive pulse $P_3$ following pulse $P_2$. Specifically, when the time interval between pulse $P_1$ and pulse $P_2$ matches with (3) predicted value at the time of reception of pulse $P_3$ after reception of pulse $P_2$, a sequence of pulses $P_1$, $P_2$, and $P_3$ indicates conformity with the estimated code format of the message.

Finally, when the time interval between pulse $P_1$ and pulse $P_2$ matches with message temporal length C at the time of reception of pulse $P_4$ after reception of pulse $P_3$, a sequence of pulses $P_1$, $P_2$, $P_3$, and $P_4$ can be confirmed as indicating the message transmitted from another node 2.

In the communication method according to the present embodiment, it is important that a temporal length from the first pulse to the last pulse maintains fixed message temporal length C. A message temporal length used between nodes belonging to one network may be different from a message temporal length used between nodes belonging to another network. By allowing difference in message temporal length, only a message from nodes 2 belonging to an identical network can selectively be received.

As shown in FIGS. 2 and 3(A), a signal including a pulse train used in the communication method according to the present embodiment includes two pulses (pulses $P_1$ and $P_4$) defining start and end of a message, respectively, and further two pulses (pulses $P_2$ and $P_3$) defining within the message, time interval $f(x)$ calculated from an input value in accordance with a first function and time interval $g(x)$ calculated from the input value in accordance with a second function, respectively.

When such signals including the pulse train are superimposed on each other, pulse trains from different nodes 2 appear as being mixed, however, a message can correctly be reproduced from these pulse trains present as being mixed. Specifically, node 2 on a reception side reproduces the message from the received signal including the pulse train, by determining a set of four pulses that matches in $f(x)$, $g(x)$, and $C-f(x)-g(x)$ (the order of arrangement being arbitrary) with the received signal, in respect to time intervals defined by the four pulses.

FIG. 3(B) shows an example in which time interval $f(x)$=time interval $g(x)$=x (identical to value x which is the input value to be encoded or a value obtained by standardizing value x which is the input value to be encoded to be within a prescribed range) is adopted as a most simplified format. In other words, in the format shown in FIG. 3(B), time interval $f(x)$ (a first time interval) and time interval $g(x)$ (a second time interval) are both set to an identical value that indicates value x which is the input value.

By adopting such a simplified format, processing for calculating a predicted value of time interval $g(x)$ to be observed next from observed time interval $f(x)$ as shown in FIG. 3(A) can be simplified.

Figure 4:
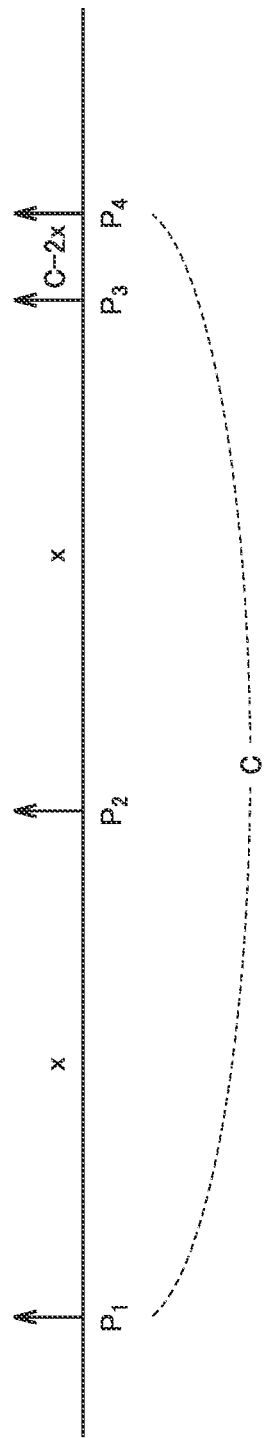
FIG. 4 is a diagram for illustrating an exemplary configuration in which the code format of the message shown in FIG. 2 is simplified.

FIG. 4 is a diagram for illustrating an exemplary configuration in which the code format of the message shown in FIG. 2 is simplified. In the code format shown in FIG. 4, by matching two time intervals with the input value as shown in FIG. 3(B), three time intervals within message temporal length C are calculated as x, x, and C-2x. The code format of the message adopted in the communication method according to the present embodiment may also be referred to as an "x/x/C-2x code" below. As described above, the order of arrangement of three time intervals within a message can arbitrarily be determined.

By adopting the x/x/C-2x code as shown in FIG. 4, at node 2 where a pulse train including at least any four pulses has been received, a transmitted message can be detected based on whether or not two pulses that define fixed message temporal length C appear and whether or not identical time interval x is repeated within message temporal length C defined by the two pulses. By applying such two conditions to detection of a message, the error correction function can be provided.

In other words, even when different messages are simultaneously transmitted from different nodes 2, each message can be reconstructed without being affected by the different message as much as possible.

In particular, when time interval x is assumed as a continuous time, within one detected message temporal length C, the probability that first time interval x corresponding to a period from a first pulse to a second pulse and second time interval x corresponding to a period from the second pulse to a third pulse are defined by pulses from different senders is substantially zero, which means achievement of independency of a sender. Further detailed description will be given below.

Figure 5:
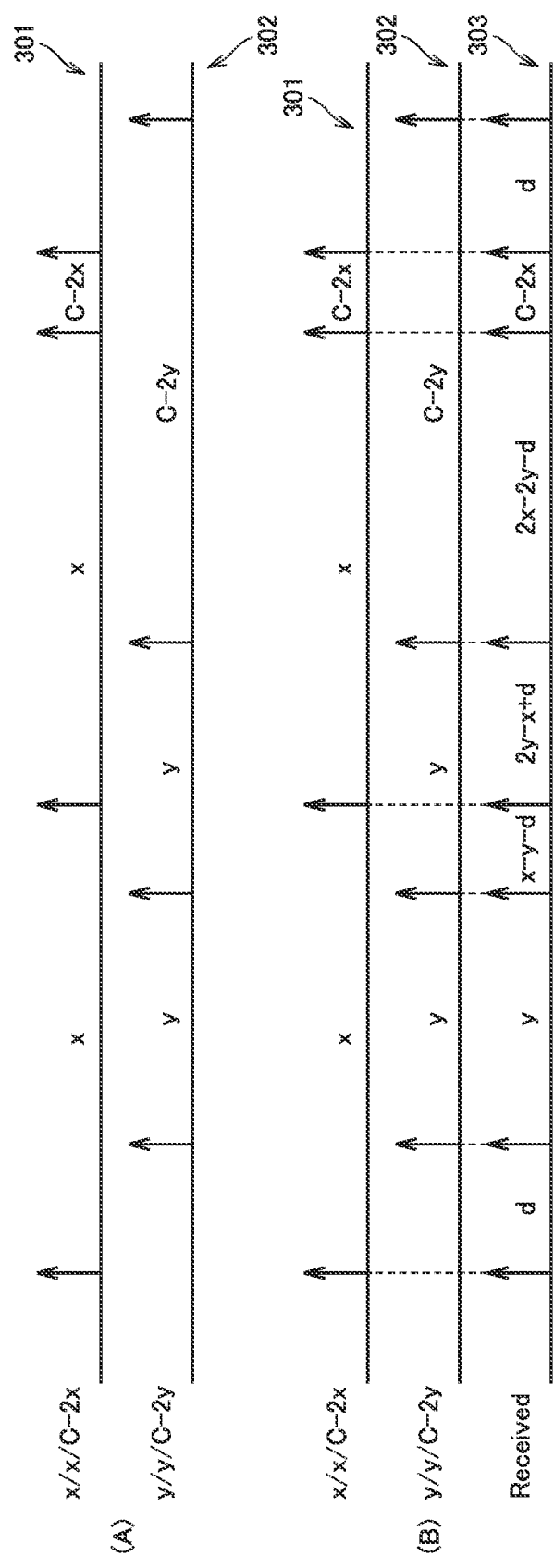
FIG. 5 is a diagram for illustrating exemplary processing when messages are transmitted from a plurality of nodes in accordance with the code format of the message used in the communication method according to the present embodiment.
Figure 6:
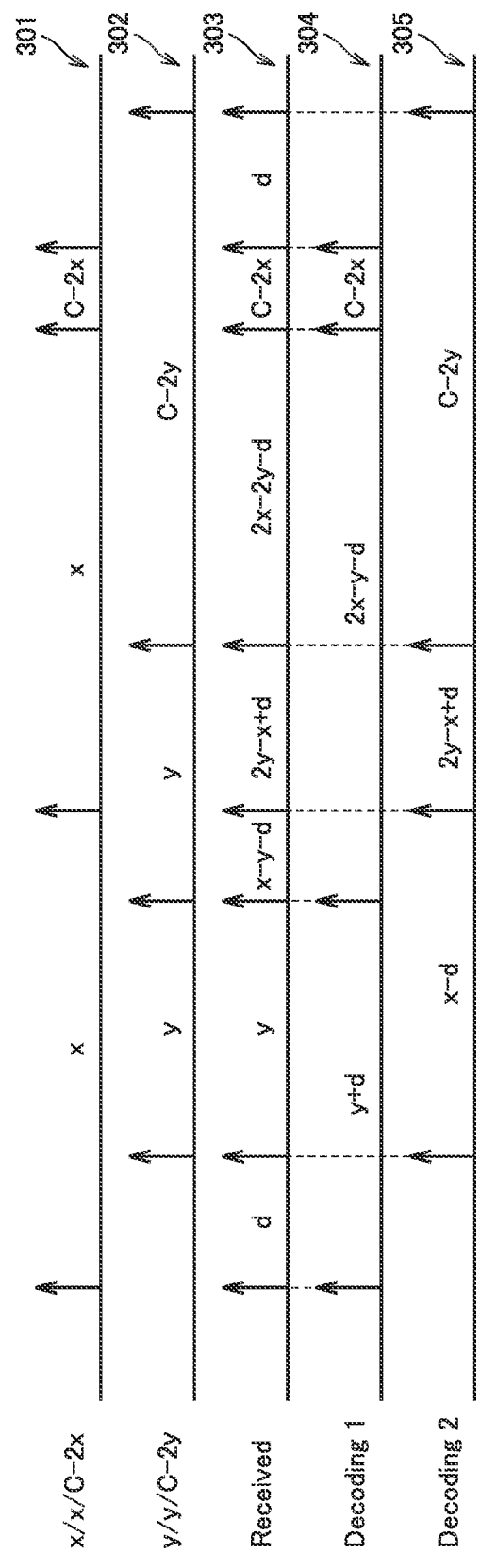
FIG. 6 is a diagram for illustrating exemplary processing when messages are transmitted from a plurality of nodes in accordance with the code format of the message used in the communication method according to the present embodiment.

FIGS. 5 and 6 are diagrams for illustrating exemplary processing when messages are transmitted from a plurality of nodes 2 in accordance with the code format or the message used in the communication method according to the present embodiment.

Referring to FIG. 5(A), for example, a message 301 (x/x/C 2x) obtained by encoding value x and a message 302 (y/y/C-2y) obtained by encoding a value y are discussed. An example where these two messages are substantially simultaneously transmitted from different nodes 2 is assumed. In the example shown in FIG. 5, timing of start of transmission of message 301 and timing of start of transmission of message 302 are assumed as being different from each other by a delay time period d. In other words, transmission periods of message 301 and message 302 overlap (collide) with each other.

FIG. 5(B) shows a signal waveform received at node 2 where both of message 301 and message 302 can be received. A reception pulse train 303 represents superimposition of signal waveforms of message 301 and message 302 on each other.

At each node 2, the message embedded in reception pulse train 303 should be extracted.

Referring to FIG. 6, a result of decoding 304 and a result of decoding 305 represent examples of message candidates extracted front reception pulse train 303.

Turning to result of decoding 304, the first time interval is expressed as y+d, the second time interval is expressed as 2x y d, and the third time interval is expressed as C-2x. In order to satisfy the x/x/C-2x code format, the first time interval (y+d) should match with the second time interval (2x y d). Namely, relation of y−x d should be satisfied.

Turning to result of decoding 305, the first time interval is expressed as x−d, the second time interval is expressed as 2y−x+d, and the third time interval is expressed as C-2y. In order to satisfy the x/x/C-2x code format, the first time interval (x−d) should match with the second time interval (2y−x+d). Namely, relation of y=x−d should be satisfied.

In order to satisfy the x/x/C-2x code format in any of result of decoding 304 and result of decoding 305, it can be seen that relation of y=x−d should be established as a common condition. Namely, result of decoding 304 is not substantially different from result or decoding 305, and this is also applicable to other results of decoding.

With this condition being applied to result of decoding 304, the first time interval is expressed as x, the second time interval is expressed as x, and the third time interval is expressed as C-2x, which matches with message 301.

With this condition being applied to result of decoding 305, the first time interval is expressed as y, the second time interval is expressed as y, and the third time interval is expressed as C 2y, which matches with message 302.

Namely, establishment of relation of y=x−d is equivalent to successful correct decoding of transmitted message 301 and message 302.

It can thus be seen that a message can be decoded with sufficiently high accuracy by adopting the x/x/C-2x code according to the present embodiment. A value encoded with the x/x/C 2x code according to the present embodiment may be a continuous time or a discrete time.

(b2: Spike Automaton)

An implementation used in decoding of a message in the communication method according to the present embodiment will now be described.

In the present embodiment, an automaton model (which is also referred to as a "spike automaton" or "SA" below) in which an algorithm for decoding a message is described is introduced. In the description below, a term "spike" substantially synonymous to a pulse is also used.

Figure 7:
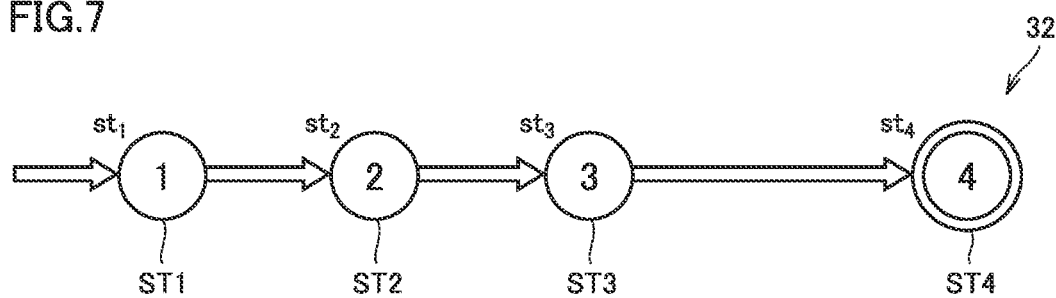
FIG. 7 is a diagram for illustrating a spike automaton used for decoding a message in the communication method according to the present embodiment.

The spike automaton recognizes a spike train (a sequence of spikes) generated in a pattern of a fixed time period (message temporal length C). FIG. 7 is a diagram for illustrating a spike automaton 32 used for decoding a message in the communication method according to the present embodiment.

Referring to FIG. 7, spike automaton 32 includes four states ST1, ST2, ST3, and ST4 in correspondence with a message of the x/x/C-2x code. In spike automaton 32, each time a transition condition is satisfied, transition is successively made from the left to the right on the sheet plane and no transition in a reverse direction is made.

Spike times $st_1$, $st_2$, $st_3$, and $st_4$ are associated with four states ST1, ST2, ST3, and ST4, respectively. The spike time refers to a condition for state transition. A condition for transition from one state ST to a next state ST' is detection of a spike (that is, occurrence of a pulse event) at the spike time associated with next state ST'.

The last state (state ST4 in the example shown in FIG. 7) of spike automaton 32 corresponds to an acceptance state. Reaching the acceptance state in one spike automaton 32 means successful correct decoding of a message. A message corresponding to spike automaton 32 that has reached the acceptance state is confirmed.

When the x/x/C-2x code according to the present embodiment is adopted, the first time interval (time interval f(x); value x) should be obtained. Therefore, at a time point of occurrence of two spikes (pulse events), spike automaton 32 can be generated and a spike time associated with each state can be determined. At this time, the current state of spike automaton 32 is the second state (state ST2).

For example, it is assumed that message temporal length C=10.0 is set, the first spike (pulse event) occurs at time t=1.5, and the second spike (pulse event) occurs at time t=3.5. Then, the spike time associated with each state of spike automaton 32 can be determined as $st_1$-1.5, $st_2$-3.5, $st_3$-5.5, and $st_4$-11.5.

Spike automaton 32 is set to the second state (state ST2). Therefore, when a spike (pulse event) occurs thereafter at time t=5.5, transition to the next state (state ST3) is made. Furthermore, when a spike (pulse event) occurs at time t=11.5, transition to the acceptance state (state ST4) is made. When the state reaches the acceptance state, the message has successfully correctly been decoded.

When a spike (pulse event) has not occurred by the spike time associated with the next state, there is a zero probability for spike automaton 32 to make a transition to the next state. Therefore, spike automaton 32, for which there is a zero probability of a transition to the next state, may be discarded as appropriate.

As set forth above, in the communication method according to the present embodiment, decoding processing using spike automaton 32 may be adopted by way of example. A specific procedure for application of spike automaton 32 will be described later.

C. Exemplary Configuration of Node

Figure 8:
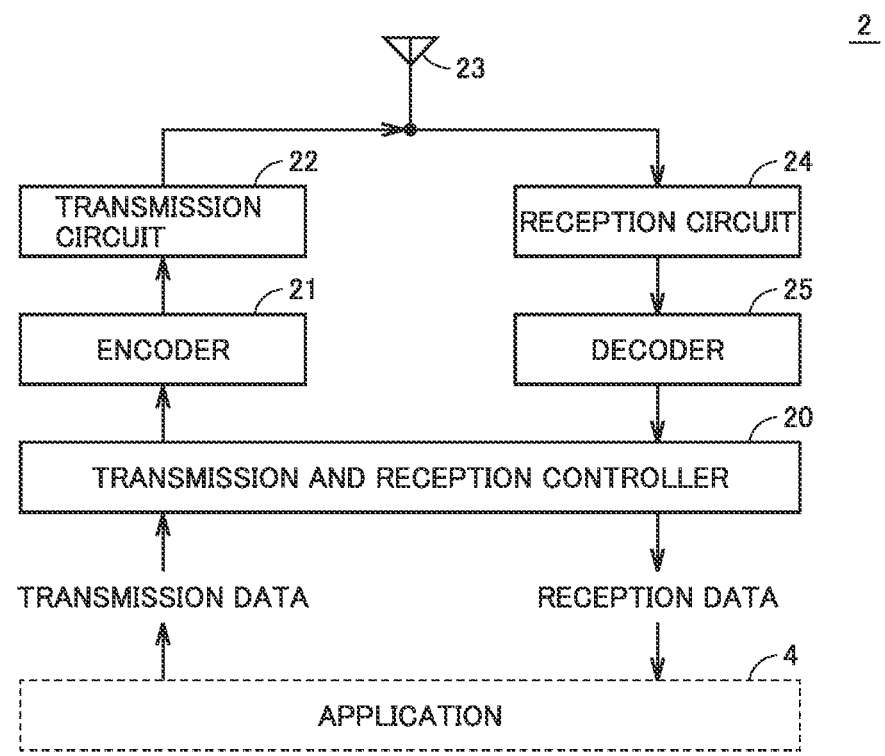
FIG. 8 is a schematic diagram showing an exemplary configuration of a node included in the network system according to the present embodiment.

An exemplary configuration of node 2 that constitutes network system 1 will now be described. FIG. 8 is a schematic diagram showing an exemplary configuration of node 2 included in network system 1 according to the present embodiment.

Referring to FIG. 8, node 2 transmits to another node 2, data to be transmitted (which is also referred to as "transmission data" below) provided from an application 4 arranged inside or outside, and transmits to application 4, data received from another node 2 (which is also referred to as "reception data" below). Node 2 includes a transmission and reception controller 20, an encoder 21, a transmission circuit 22, an antenna 23, a reception circuit 24, and a decoder 25 as components for performing the communication method according to the present embodiment.

Transmission and reception controller 20 controls reception of transmission data from application 4 and output of reception data to application 4. Transmission and reception controller 20 may perform processing such as addition of a redundant code to transmission data or error correction of reception data.

Encoder 21 generates one message or a plurality of messages from transmission data from transmission and reception controller 20 in accordance with an encoding rule as will be described later.

Transmission circuit 22 generates a wireless signal indicating a message generated by encoder 21. The wireless signal generated by transmission circuit 22 is emitted from antenna 23.

Reception circuit 24 receives a wireless signal through antenna 23 and provides change over time in amplitude indicated by the wireless signal to decoder 25.

Decoder 25 extracts and reproduces a message received from another node 2 based on change over time in amplitude from reception circuit 24. Decoder 25 provides a value indicated by the reproduced message to transmission and reception controller 20. Transmission and reception controller 20 collectively provides values indicated in messages from decoder 25 to application 4 as reception data.

D. Encoding Processing

Encoding processing in the communication method according to the present embodiment will now be described.

Figure 9:
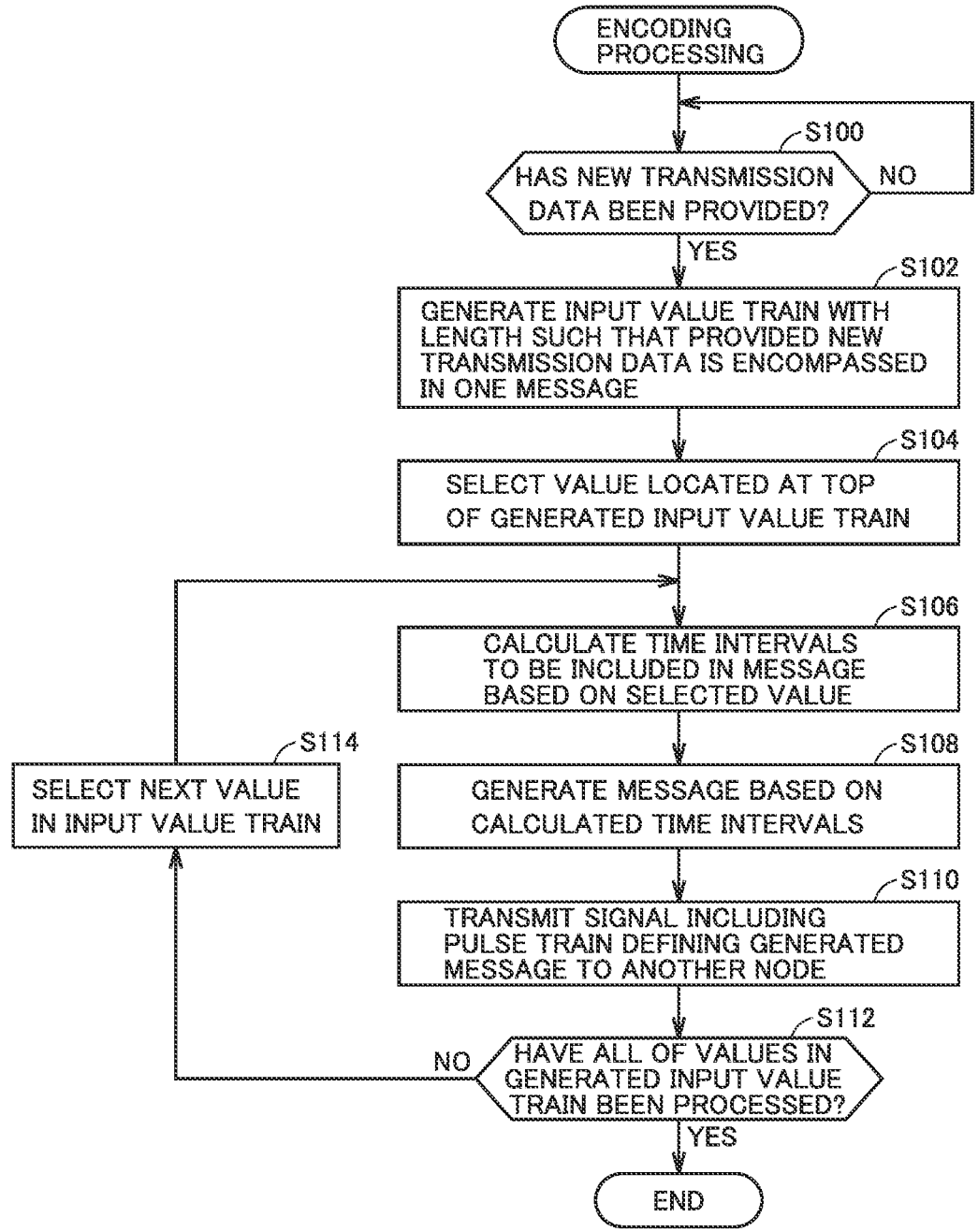
FIG. 9 is a flowchart showing a procedure in encoding processing in the communication method according to the present embodiment.

FIG. 9 is a flowchart showing a procedure in encoding processing in the communication method according to the present embodiment. Each step shown in FIG. 9 is performed by encoder 21 at node 2 shown in FIG. 8.

Referring to FIG. 9, sender node 2 determines whether or not new transmission data has been provided (step S100). When new transmission data has not been provided (NO in step S100), processing in step S100 is repeated.

When new transmission data has been provided (YES in step S100), sender node 2 generates an input value train with a length such that the provided new transmission data is encompassed in one message (step S102).

Sender node 2 selects a value located at the top of the input value train generated in step S102 (step S104) and calculates time intervals to be included in the message based on the selected value (step S106). Sender node 2 generates a message based on the time intervals calculated in step S106 (step S108). Namely, sender node 2 generates a message having predetermined message temporal length C that indicates an input value to be encoded. A signal including a pulse train defining the generated message is then transmitted from sender node 2 to another node 2 (step S110). Namely, sender node 2 transmits the signal including the pulse train corresponding to the generated message.

Sender node 2 determines whether or not all values in the input value train generated in step S102 have been processed (step S112). When there is an unprocessed value in the generated input value train (NO in step S112), sender node 2 selects a next value in the input value train (step S114) and repeats processing in step S106 and later.

When all values in the generated input value train have been processed (YES in step S112), the encoding processing ends.

E. Decoding Processing

Decoding processing in the communication method according to the present embodiment will now be described. In decoding processing, spike automaton 32 is used.

Each node 2 generates spike automaton 32 for all sets each including two pulse events received at different times. In this generated spike automaton 32, the conditions for first spike time $st_1$ and second spike time $st_2$ are regarded as being satisfied. Namely, the initial state is the second state (state ST2 shown in FIG. 7).

Spike times $st_3$ and $st_4$ can be estimated front spike times $st_1$ and $st_2$ based on the x/x/C-2x code format. Namely, third spike time $st_3$ is expressed as $st_3=st_2+(st_2-st_1)-2st_2-st_1$ and fourth spike time $st_4$ is expressed as $st_4-st_1-C$.

Each node 2 holds generated spike automaton 32 and updates us appropriate the state of each spike automaton 32 in response to a pulse event that occurs at each node 2. Each node 2 holds also a pulse event that occurs at each node 2. Namely, each time the pulse event occurs, each node 2 determines whether or not time of occurrence of the pulse event matches with the spike time set in each held spike automaton 32. Each node 2 allows spike automaton 32 in which time of occurrence of the pulse event matches with the spike time to make transition to the next state. Finally, for spike automaton 32 that has reached the acceptance state, it is determined that the message was successfully correctly decoded and the decoded message is provided as output.

Spike automaton 32 found to be unable to reach the acceptance state with lapse of time does not have to be held. For example, when a pulse event does not occur in spike automaton 32 in the second state even after spike time $st_3$, transition to the next state cannot occur. Similarly, when a pulse event does not occur in spike automaton 32 in the third state even after spike time $st_4$, transition to the next state cannot occur. Therefore, in the second state or the third state, when a pulse event does not occur even after a spike time representing a condition for transition to the next state, spike automaton 32 is deleted.

After new spike automaton 32 for a pulse event that may occur in the future is generated, a pulse event that occurred ½ of message temporal length C before the current time is no longer necessary. This is because, in the x/x/C-2x code format, the time interval between two pulse events used for generation of a new pulse event 50 is shorter than ½ of message temporal length C. Therefore, a pulse event that occurred ½ of message temporal length C before the current time is deleted.

Each node includes a pulse event queue (PEQ) for registration of a pulse event. When a new pulse event occurs at time $t_N$, the new pulse event is registered in the pulse event queue. Then, the new pulse event is present in the pulse event during a period from a time point of registration until lapse of ½ of message temporal length C.

Each node includes a set of spike automatons 32 and each spike automaton 32 estimates occurrence (or non-occurrence) of a pulse event that may occur in the figure. When a new pulse event occurs at time $t_N$, each node 2 determines whether or not the spike time in accordance with the state set for each spike automaton 32 matches with time $t_N$. The state of each spike automaton 32 is thus sequentially updated. When the state of any spike automaton 32 reaches the acceptance state, a message corresponding to spike automaton 32 is determined as having successfully correctly been decoded.

When a new pulse event occurs at time $t_N$ while a pulse event that occurred at time is has been registered in the pulse event queue, the spike time of spike automaton 32 is calculated as $st_1=t_s$, $st_2=t_N$, $st_3=2t_N-t_s$ and $st_4=t_s+C$. Newly generated spike automaton 32 is set to the second state.

Processing as above is repeatedly performed.

Figure 10:
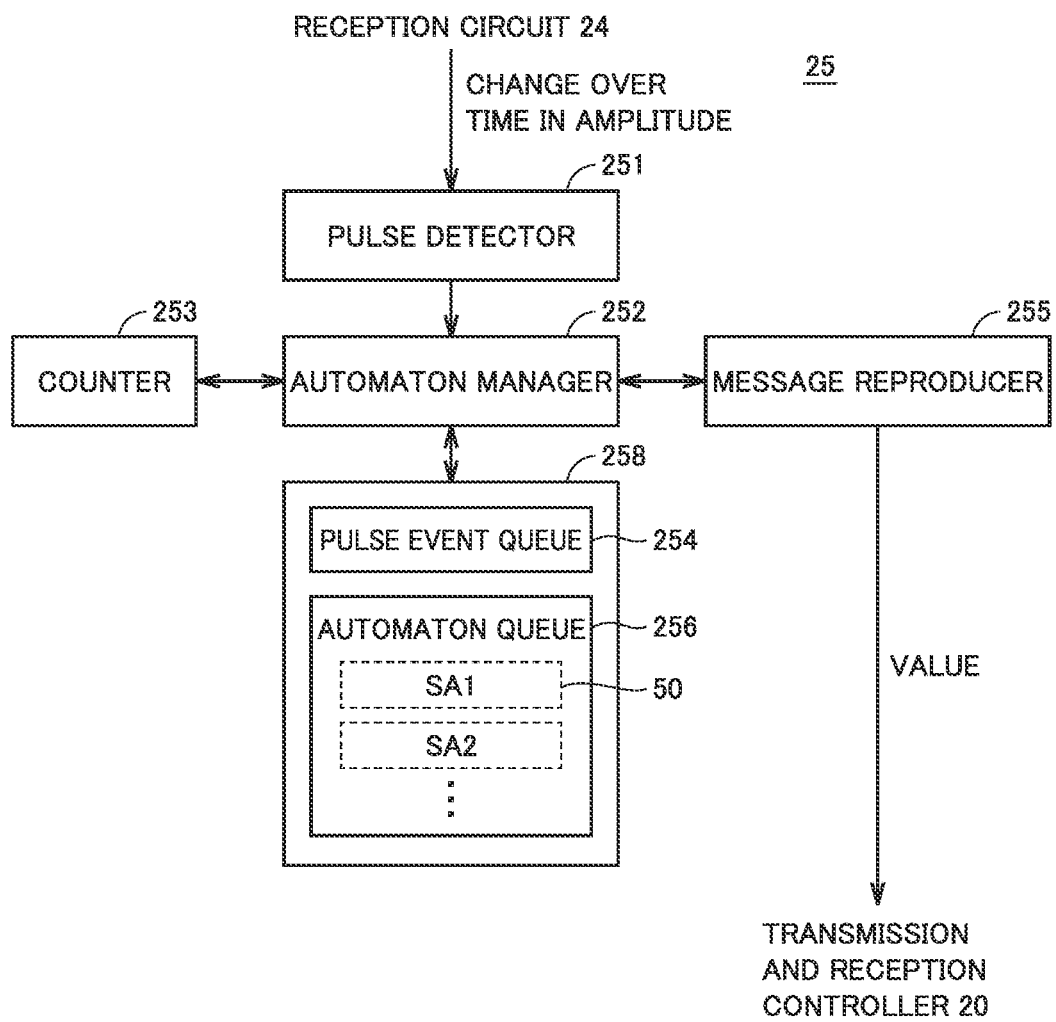
FIG. 10 is a schematic diagram showing a more detailed exemplary configuration of a decoder shown in FIG. 8.

FIG. 10 is a schematic diagram showing a more detailed exemplary configuration of decoder 25 shown in FIG. 8. Referring to FIG. 10, decoder 25 includes a pulse detector 251, an automaton manager 252, a counter 253, a message reproducer 255, and a register 258. Register 258 includes a pulse event queue (PEQ) 254 and an automaton queue 256.

Pulse detector 251 detects a pulse that appears in a wireless signal based on change over lime in amplitude provided from reception circuit 24. Pulse detector 251 generates a pulse event in response to detection of the pulse.

Automaton manager 252 registers a pulse event in pulse event queue 254 in response to detection of the pulse by pulse detector 251, and generates spike automaton 32 in automaton queue 256 and/or updates the state of generated spike automaton 32. Automaton manager 252 deletes from pulse event queue 254, a pulse event that has been registered in pulse event queue 254 for a designated time period and deletes a spike automaton that has been present for a designated time period among spike automatons 32 generated in automaton queue 256.

Counter 253 functions as a kind of a timer and counts up an internal counter every predetermined cycle. Automaton manager 252 determines whether or not a condition for updating the state of spike automaton 32 is satisfied by referring to the internal counter counted up by counter 253.

Message reproducer 255 determines that a message has successfully been reconstructed for a spike automaton that has reached the acceptance state under the control by automaton manager 252 among spike automatons 32 generated in automaton queue 256, and provides a value indicated in the message as output.

Figure 11:
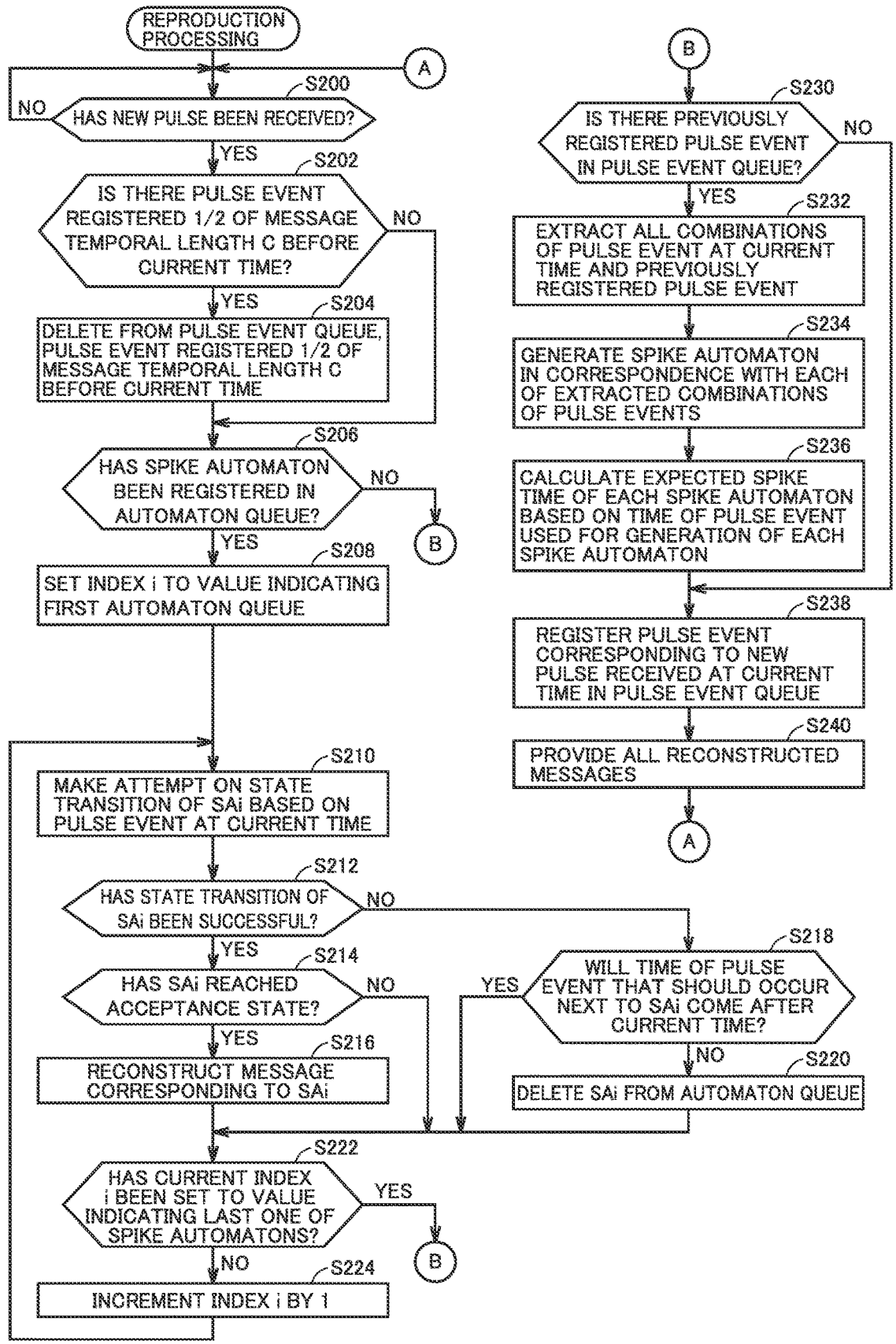
FIG. 11 is a flowchart showing a procedure in decoding processing in the communication method according to the present embodiment.

FIG. 11 is a flowchart showing a procedure in decoding processing in the communication method according to the present embodiment. Each step shown in FIG. 11 is performed by decoder 25 at node 2 shown in FIGS. 8 and 10.

Referring to FIG. 11, reception-side node 2 determines whether or not it has received a new pulse (step S200). When node 2 has not received a new pulse (NO in step S200), processing in step S200 is repeated.

When reception-side node 2 has received a new pulse (YES in step S200), it determines whether or not there is a pulse event registered ½ of message temporal length C before the current time (step S202). When there is a pulse event registered ½ of message temporal length C before the current time (YES in step S202), reception-side node 2 deletes the pulse event registered ½ of message temporal length C before the current time from the pulse event queue (step S204).

When there is no pulse event registered ½ of message temporal length C before the current time (NO in step S202), processing in step S204 is skipped.

In succession, reception-side node 2 determines whether or not spike automaton 32 has been registered in automaton queue 256 (step S206). When no spike automaton 32 has been registered in automaton queue 256 (NO in step S206), the process proceeds to step S230.

When spike automaton 32 has been registered in automaton queue 256 (YES in step S206), reception-side node 2 sets an index i for identifying spike automaton 32 registered in automaton queue 256 to a value indicating first automaton queue 256 (step S208). Spike automaton 32 identified by index i is denoted as "SAi" below.

Reception-side node 2 attempts to make state transition of SAi based on the pulse event at the current time (step S210), and determines whether or not state transition of SAi has successfully been made (step S212). When state transition of SAi has successfully been made (YES in step S212), reception-side node 2 determines whether or not SAi has reached the acceptance state (step S214).

When SAi has reached the acceptance state (YES in step S214), reception-side node 2 reconstructs a message corresponding to SAi (step S216). When SAi has not reached the acceptance state (NO in step S214), processing in step S216 is skipped.

When state transition of SAi has failed (NO in step S212), reception-side node 2 determines whether or not time of a pulse event that should occur next and is calculated based on the state of SAi will conic after the current time (step S218).

When the time of the pulse event that should occur next came before the current time (NO in step S218), reception-side node 2 deletes SAi from the automaton queue (step S220). When the time of the pulse event that should occur next will come after the current time (YES in step S218), processing in step S220 is skipped.

In succession, reception-side node 2 determines whether or not current index i has been set to a value indicating the last spike automaton among spike automatons 32 registered in automaton queue 256 (step S222). When current index i does not have a value indicating the last spike automaton among spike automatons 32 registered in automaton queue 256 (NO in step S222), reception-side node 2 increments index i by 1 (step S224). Then, processing in step S210 and later is repeated.

When current index i has a value indicating the last spike automaton among spike automatons 32 registered in automaton queue 256 (YES in step S222), the process proceeds to step S230.

In step S230, reception-side node 2 determines whether or not there is a previously registered pulse event in the pulse event queue (step S230). When there is a previously registered pulse event in the pulse event queue (YES in step S230), reception-side node 2 extracts all combinations of the pulse event at the current time and the previously registered pulse event (step S232).

Reception-side node 2 generates spike automaton 32 in association with each of the combinations of the pulse events extracted in step S232 (step S234). Spike automaton 32 at the time of generation is set to the second state (state ST2). Reception-side node 2 calculates an expected spike time of each spike automaton 32 based on the time of the pulse event used for generation of each spike automaton 32 (step S236).

When there is no previously registered pulse event in the pulse event queue (NO in step S230), processing in steps S232 to S236 is skipped.

In succession, reception-side node 2 registers a pulse event corresponding to a new pulse received at current time in the pulse event queue (step S238). Typically, an identifier for identifying a pulse event and time of occurrence of the pulse event are registered in the pulse event queue.

Finally, reception-side node 2 provides all reconstructed messages as output (step S240).

Processing in step S200 and later is then repeated.

F. Exemplary Processing for Decoding Message

Exemplary processing for decoding a plurality of messages in accordance with the communication method according to the present embodiment will now be described.

Figure 12:
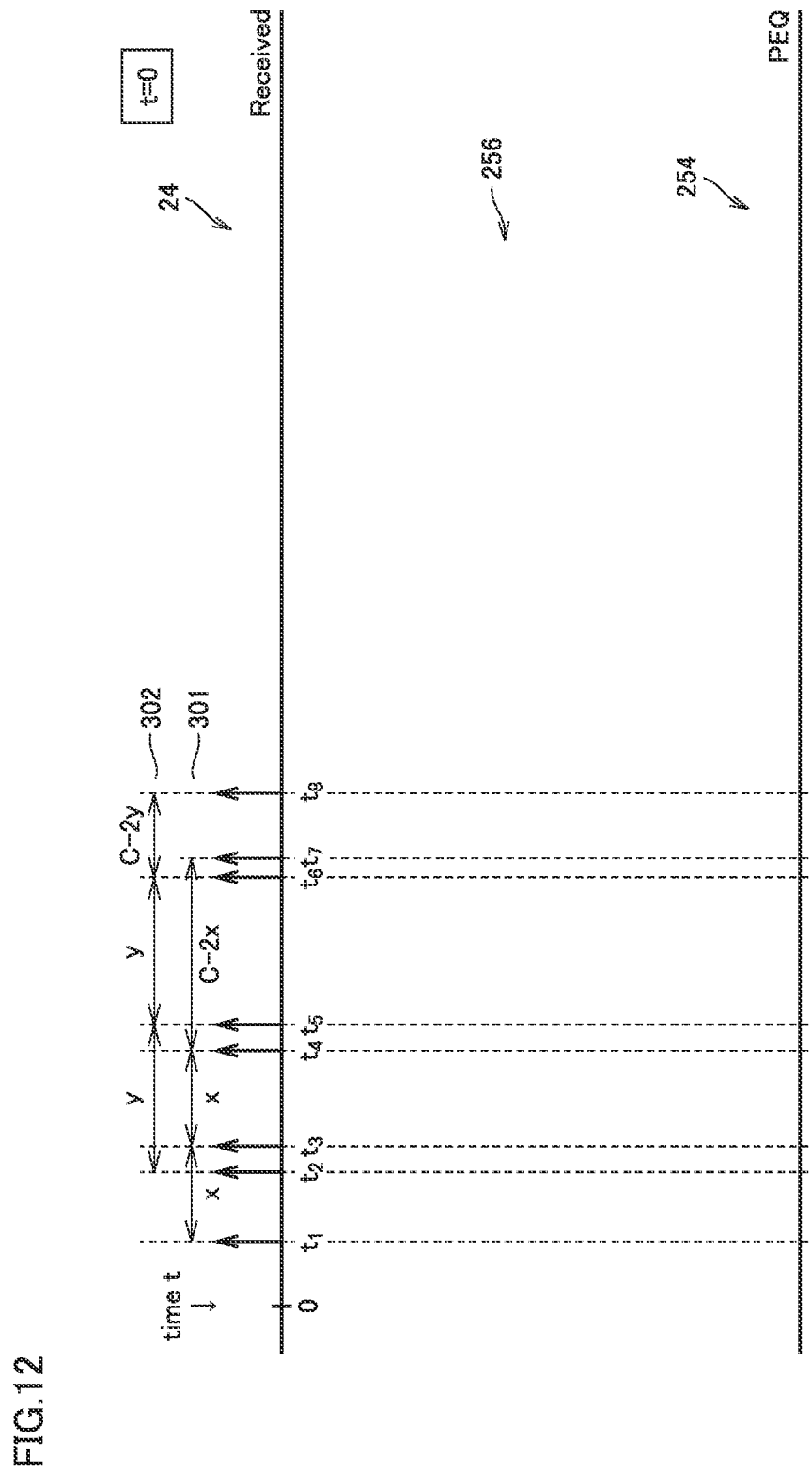
FIG. 12 is a time chart for illustrating exemplary processing for decoding a plurality of messages in accordance with the communication method according to the present embodiment (time t=0).

FIGS. 12 to 27 are time charts for illustrating exemplary processing for decoding a plurality of messages in accordance with the communication method according to the present embodiment. In the description below, an example in which a first message in which a time period corresponding to value x is allocated with respect to message temporal length C and a second message in which a time period corresponding to value y is allocated with respect to message temporal length C are transmitted as temporally overlapping with each other is shown. Specifically, as shown in FIG. 12, message 301 in which a time period corresponding to value x is allocated and message 302 in which a time period corresponding to value y is allocated are assumed.

For message 301, occurrence of pulses at an interval of x/x/C 2x is a condition for decoding, and for message 302, occurrence of pulses at an interval of y/y/C-2y is a condition for decoding.

By way of example, pulses included in message 301 are generated at times $t_1$, $t_3$, $t_4$, and $t_7$, and pulses included in message 302 are generated at times $t_2$, $t_5$, $t_6$, and $t_8$.

(f1: Initial State)

FIG. 12 shows a state of pulse event queue (PEQ) 254 in the initial state (time t=0). In the initial state, decoding processing has just been started. Therefore, no pulse event has been recorded in pulse event queue 254. A spike automaton is generated in pulse event queue 254 for each pulse event.

(f2: time $t=t_1$)

Figure 13:
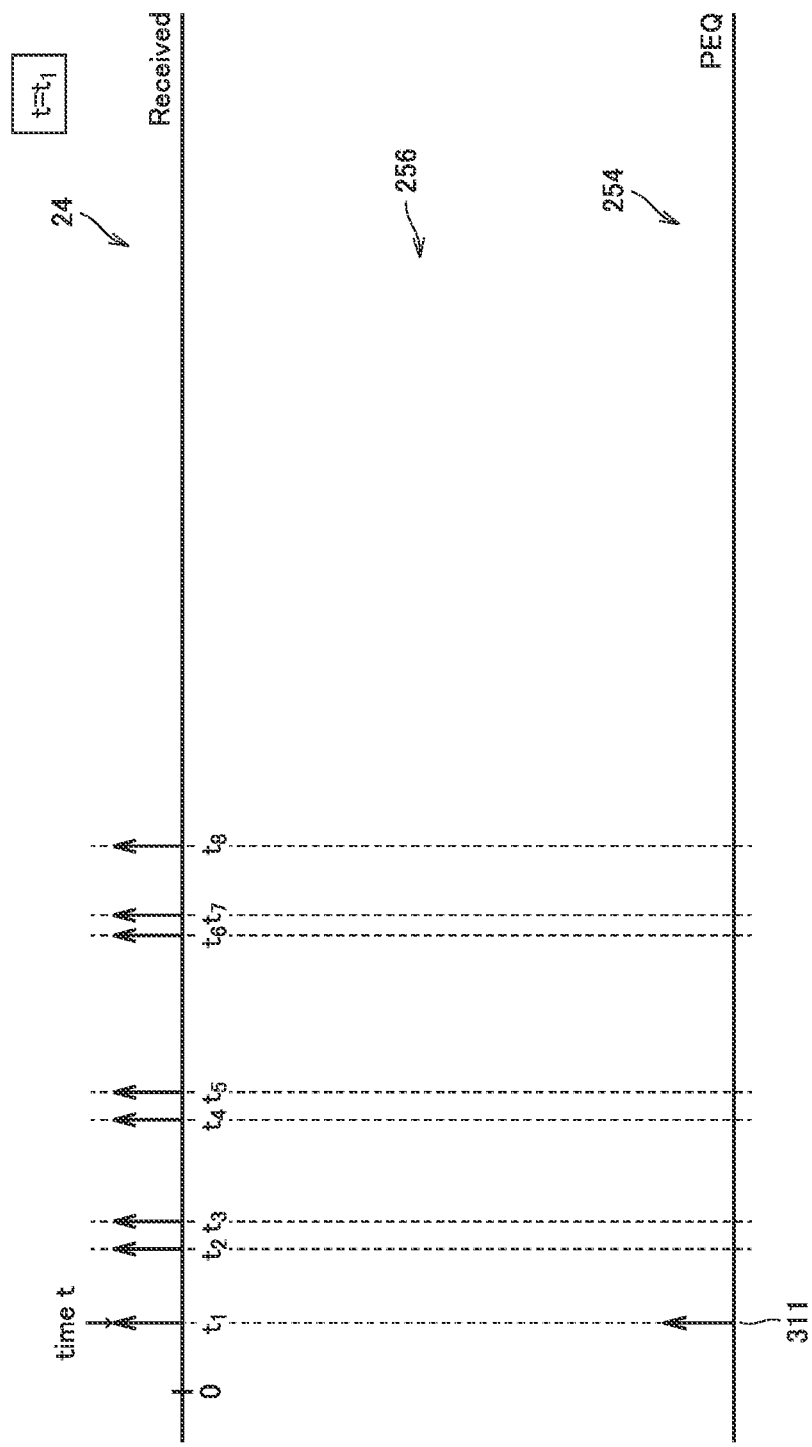
FIG. 13 is a time chart for illustrating exemplary processing for decoding a plurality of messages in accordance with the communication method according to the present embodiment (time t=$t_1$).

FIG. 13 shows a state at time $t=t_1$. A first pulse event 311 occurs at time $t_1$. Though pulse event 311 is registered in pulse event queue 254, there is no preceding pulse event present at time $t_1$. Therefore, no spike automaton is generated. Namely, a spike automaton is generated on condition that two pulse events occur during a period of ½ of message temporal length C.

(f3: time $t=t_2$)

Figure 14:
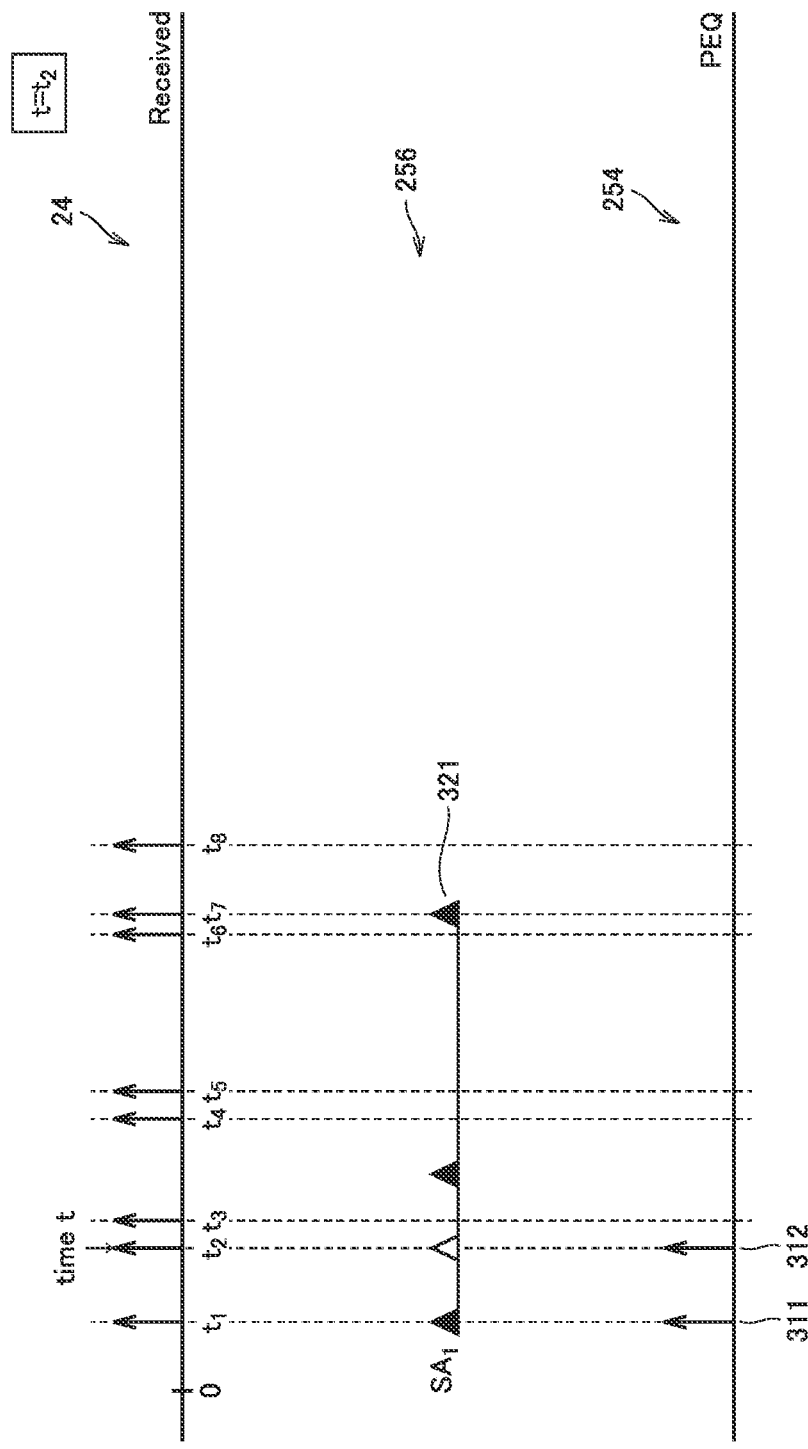
FIG. 14 is a time chart for illustrating exemplary processing for decoding a plurality of messages in accordance with the communication method according to the present embodiment time t-$t_2$).

FIG. 14 shows a state at time $t=t_2$. A second pulse event 312 occurs at time $t_2$. Pulse event 312 is registered in pulse event queue 254 and a spike automaton 321 is generated based on pulse events 311 and 312 that occurred at time $t_1$ and time $t_2$, respectively.

A triangular mark shown for spike automaton 321 in FIG. 14 represents time (which is also referred to as a "spike time" below) when a pulse event which is a condition for reconstruction as a message should occur. Namely, when pulse events occur at all times corresponding to four triangular marks provided in association with the spike automaton, the corresponding message can be reconstructed. A hollow triangular mark of the four triangular marks representing spike automaton 321 represents a current state, which is applicable also to the drawings below.

(f4: time $t=t_3$)

Figure 15:
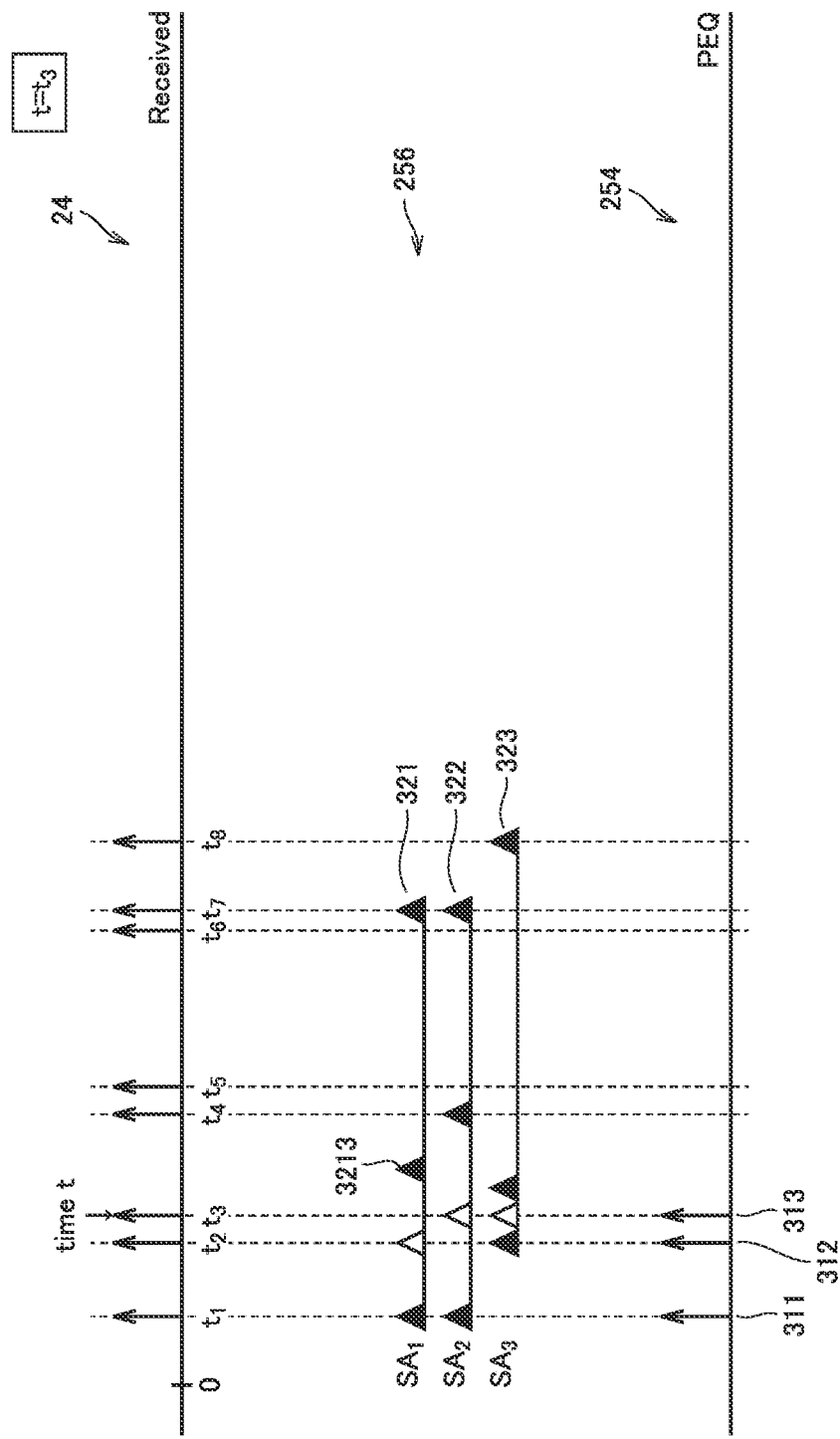
FIG. 15 is a time chart for illustrating exemplary processing for decoding a plurality of messages in accordance with the communication method according to the present embodiment (time t=$t_3$).

FIG. 15 shows a state at time $t=t_3$. A third pulse event 313 occurs at time=$t_3$. Pulse event 313 is registered in pulse event queue 254. Then, a spike automaton 322 is generated based on pulse events 311 and 313 (that occur at time $t_1$ and time $t_3$, respectively), and a spike automaton 323 is generated based on pulse events 312 and 313 (that occur at time $t_2$ and time $t_3$, respectively).

Since a spike time 3213 does not match with pulse event 313 in spike automaton 321, a condition for transition to the next state is not satisfied. Therefore, the current state of spike automaton 321 is maintained.

(f5: time $t=t_4$)

Figure 16:
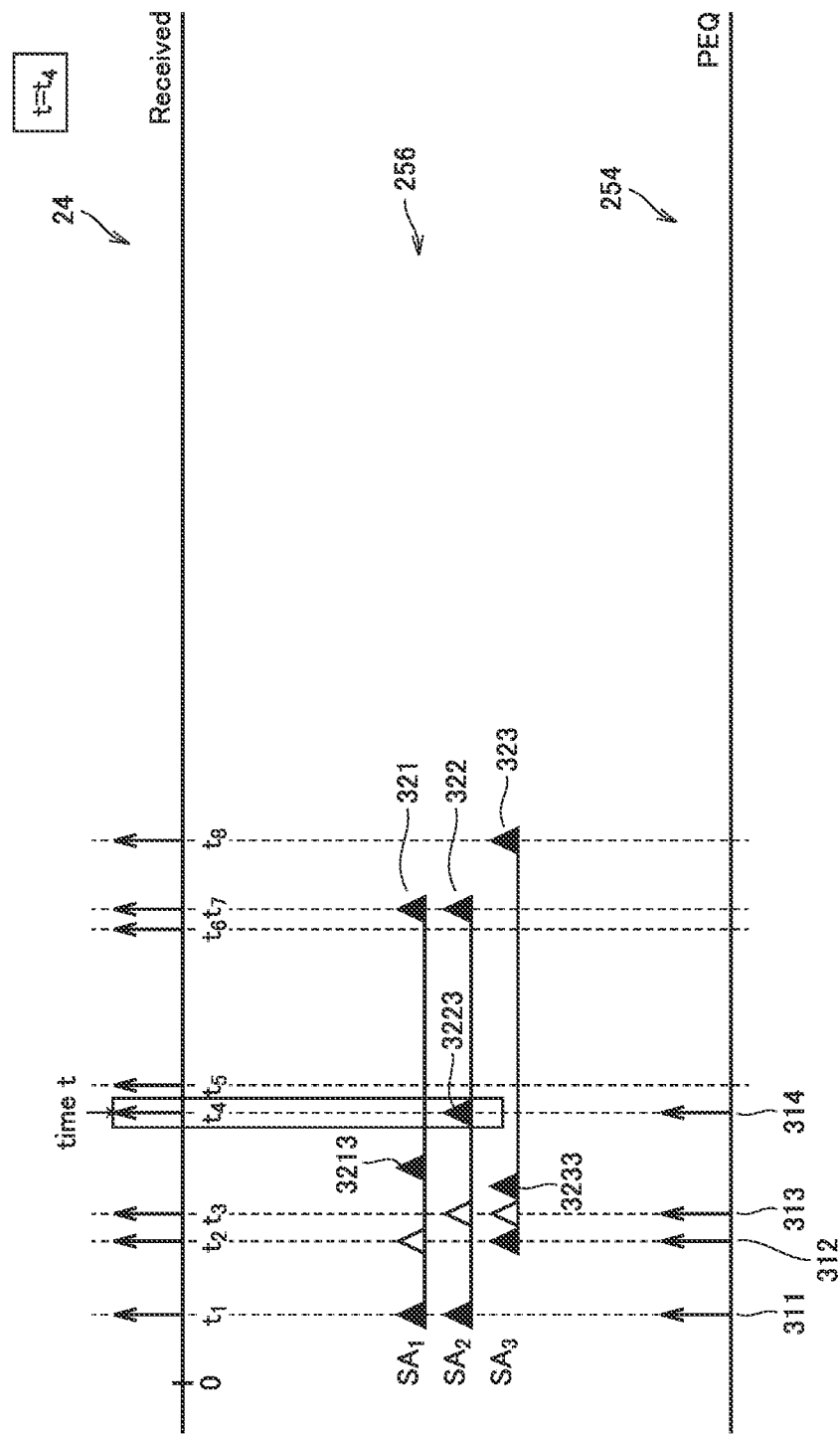
FIG. 16 is a time chart for illustrating exemplary processing for decoding a plurality of messages in accordance with the communication method according to the present embodiment (time t=$t_4$).
Figure 17:
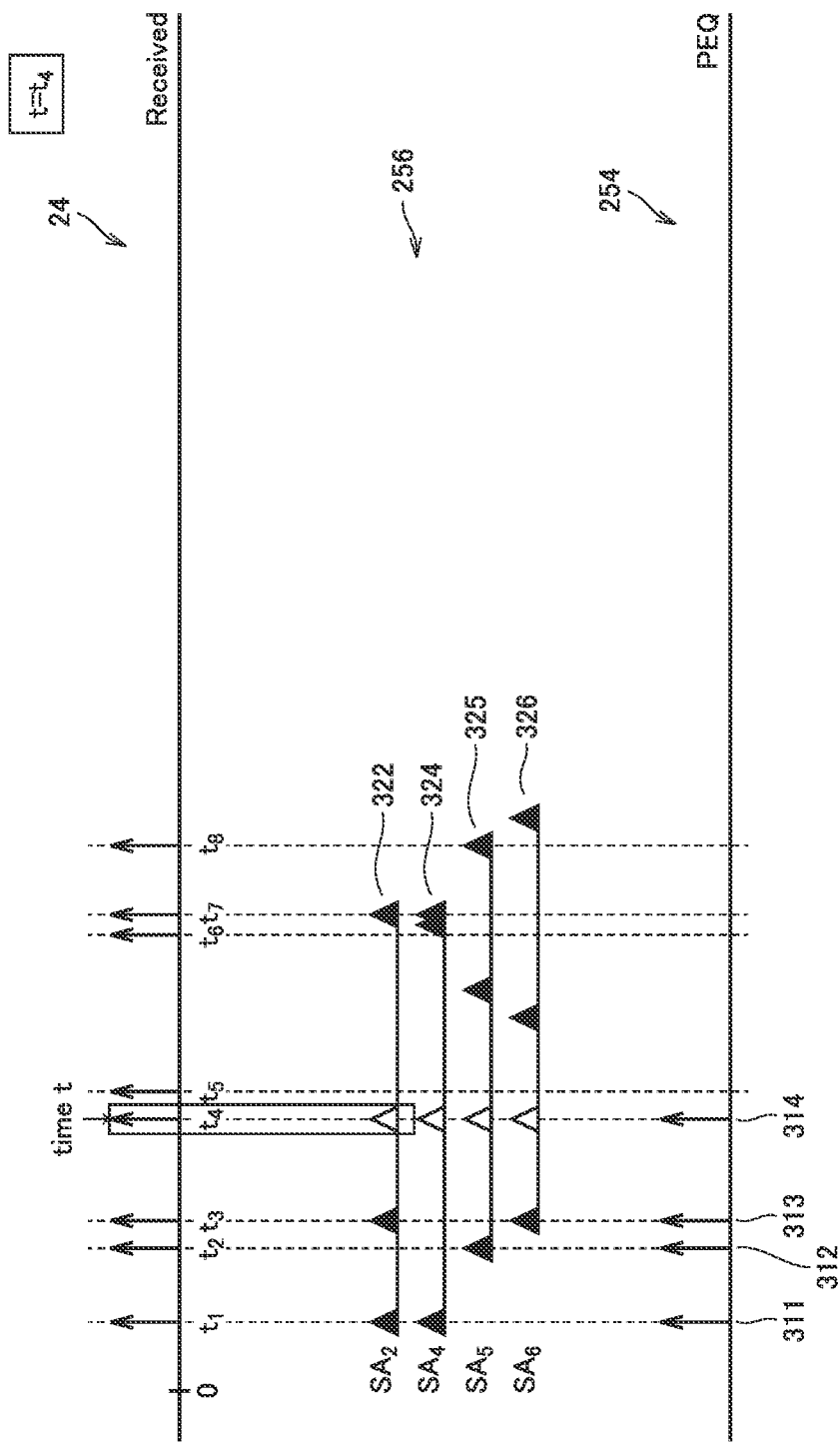
FIG. 17 is a time chart for illustrating exemplary processing for decoding a plurality of messages in accordance with the communication method according to the present embodiment (time t=$t_4$).

FIGS. 16 and 17 show a state at time $t=t_4$. A fourth pulse event 314 occurs at time $t_4$. Pulse event 314 is registered in pulse event queue 254.

Referring to FIG. 16, for spike automaton 321, spike time 3213 does not match with pulse event 314. Furthermore, since there is a zero probability of occurrence of a pulse event that matches with spike time 3213 of spike automaton 321, spike automaton 321 is deleted from automaton queue 256.

Similarly, for spike automaton 323, a spike time 3233 does not match with pulse event 314 either. Furthermore, since there is a zero probability of occurrence of a pulse event that matches with spike time 3233 of spike automaton 323, spike automaton 323 is also deleted from automaton queue 256.

Since a spike time 3223 matches with pulse event 314 in spike automaton 322, the condition for transition to the next state is satisfied. Therefore, spike automaton 322 makes transition to the next state.

Referring to FIG. 17, in addition to deletion of spike automaton 321 and spike automaton 323 and state transition of spike automaton 322, a new spike automaton is generated.

In the example shown in FIG. 17, a spike automaton 324 is generated based on pulse events 311 and 314 (that occur at time $t_1$ and time $t_4$, respectively). Similarly, a spike automaton 325 is generated based on pulse events 312 and 314 (that occur at time $t_2$ and time $t_4$, respectively). Similarly, a spike automaton 326 is generated based on pulse events 313 and 314 (that occur at time $t_3$ and time $t_4$, respectively).

(f6: time $t=t_5$)

Figure 18:
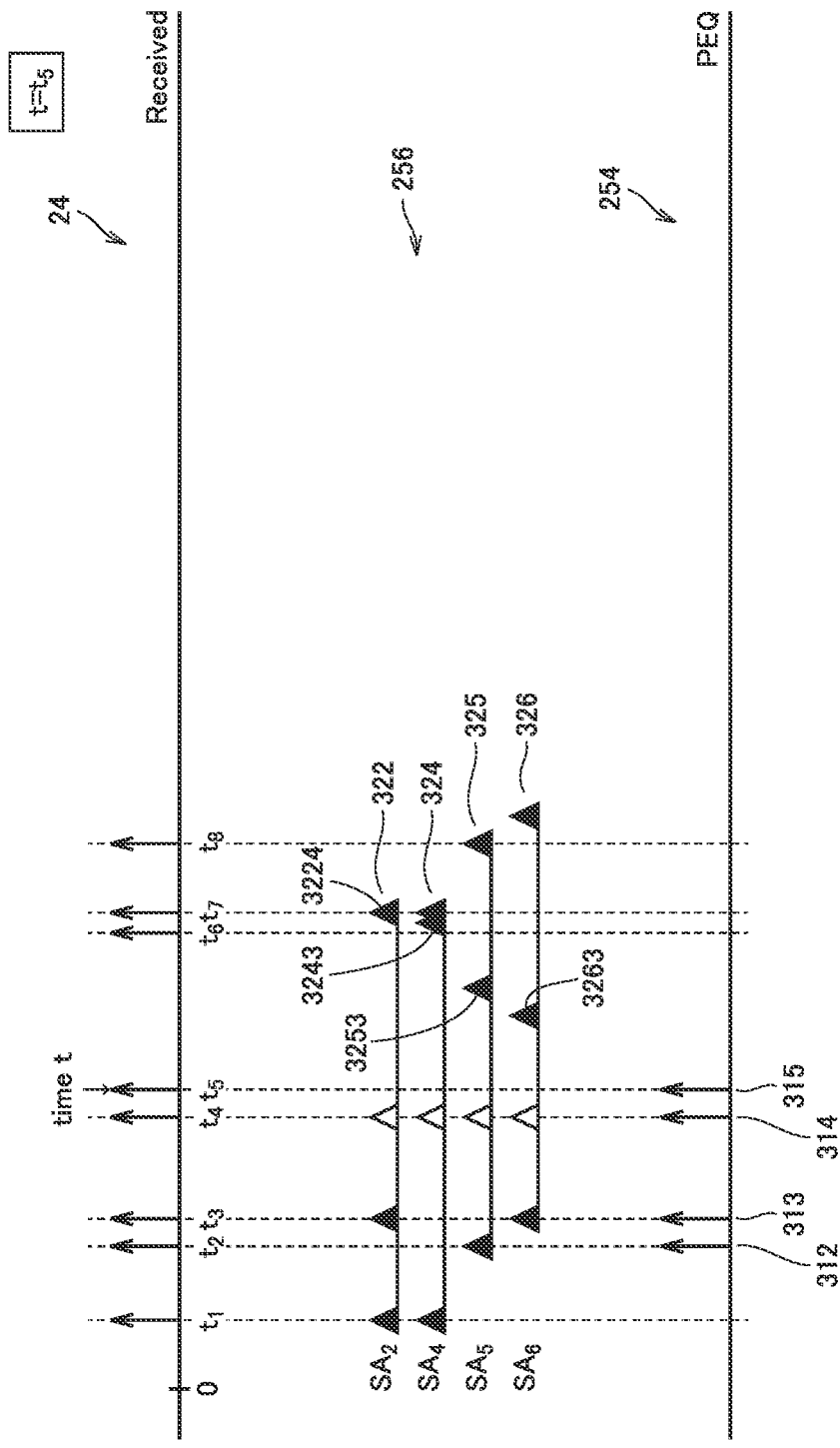
FIG. 18 is a time chart for illustrating exemplary processing for decoding a plurality or messages in accordance with the communication method according to the present embodiment (time t=$t_5$).
Figure 19:
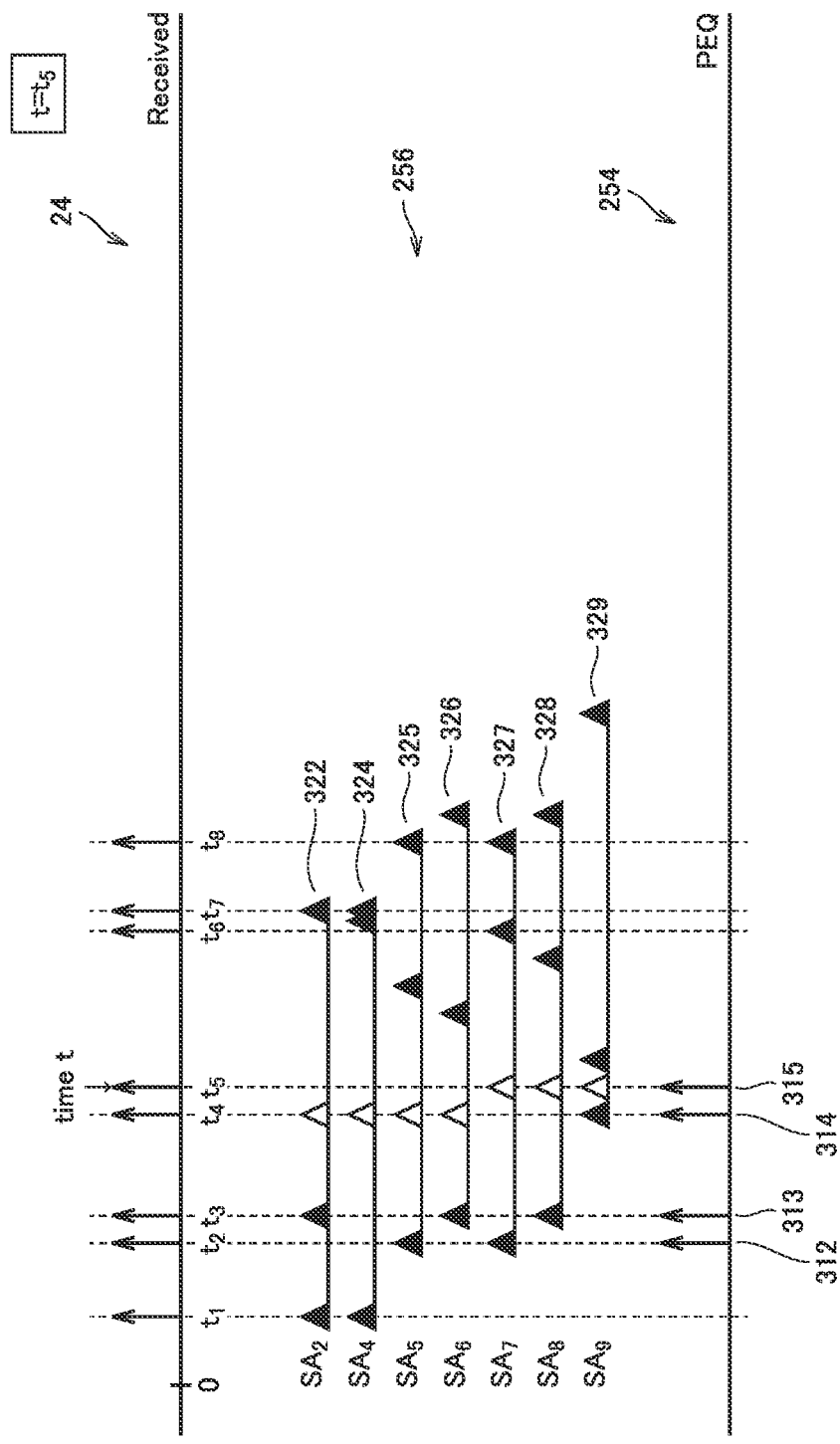
FIG. 19 is a time chart for illustrating exemplary processing for decoding a plurality of messages in accordance with the communication method according to the present embodiment (time t-$t_5$).

FIGS. 18 and 19 show a state at time $t-t_5$. A fifth pulse event 315 occurs at time $t_5$. Pulse event 315 is registered in pulse event queue 254.

Referring to FIG. 18, none of a spike time 3224 of spike automaton 322, a spike time 3243 of spike automaton 324, a spike time 3253 of spike automaton 325, and a spike time 3263 of spike automaton 326 matches with pulse event 315. Since there is a non-zero probability for all spike times to match with a pulse event that may occur in the future, the spike automatons are not deleted.

Since time $t_1$ came more than ½ of message temporal length C before time $t_5$ as the reference, it is confirmed that pulse event 311 is not necessary for determination as to generation of a spike automaton. Therefore, pulse event 311 that occurred at time $t_1$ is deleted from pulse event queue 254.

Referring to FIG. 19, in addition to deletion of pulse event 311, a new spike automaton is generated.

In the example shown in FIG. 19, a spike automaton 327 is generated based on pulse events 312 and 315 (that occur at time $t_2$ and time $t_5$, respectively). Similarly, a spike automaton 328 is generated based on pulse events 313 and 315 (that occur at time $t_3$ and time $t_5$, respectively). Similarly, a spike automaton 329 is generated based on pulse events 314 and 315 (that occur at time $t_4$ and time $t_5$, respectively).

(f7: time $t=t_6$)

Figure 20:
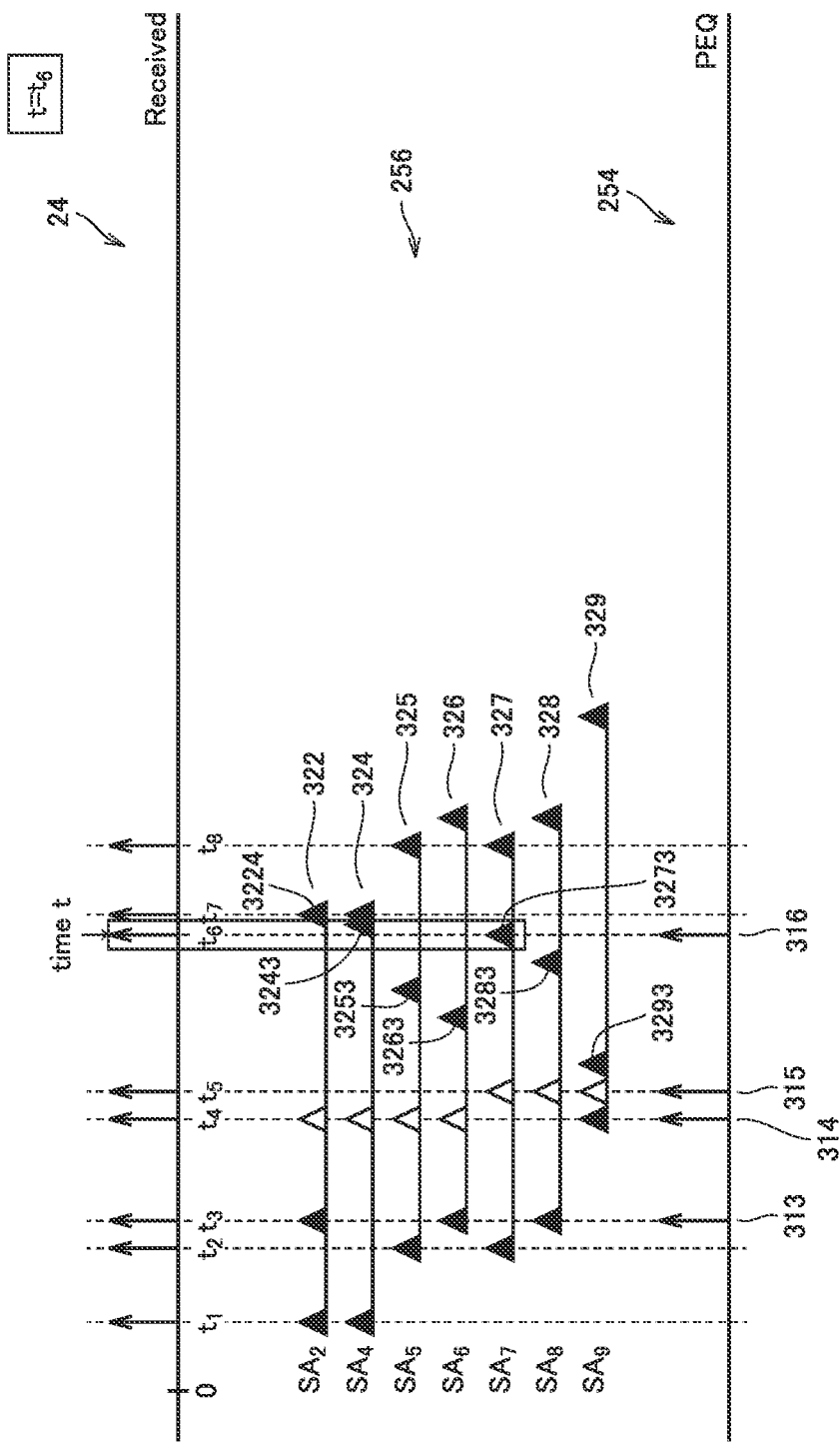
FIG. 20 is a time chart for illustrating exemplary processing for decoding a plurality of messages in accordance with the communication method according to the present embodiment (time t=$t_6$).
Figure 21:
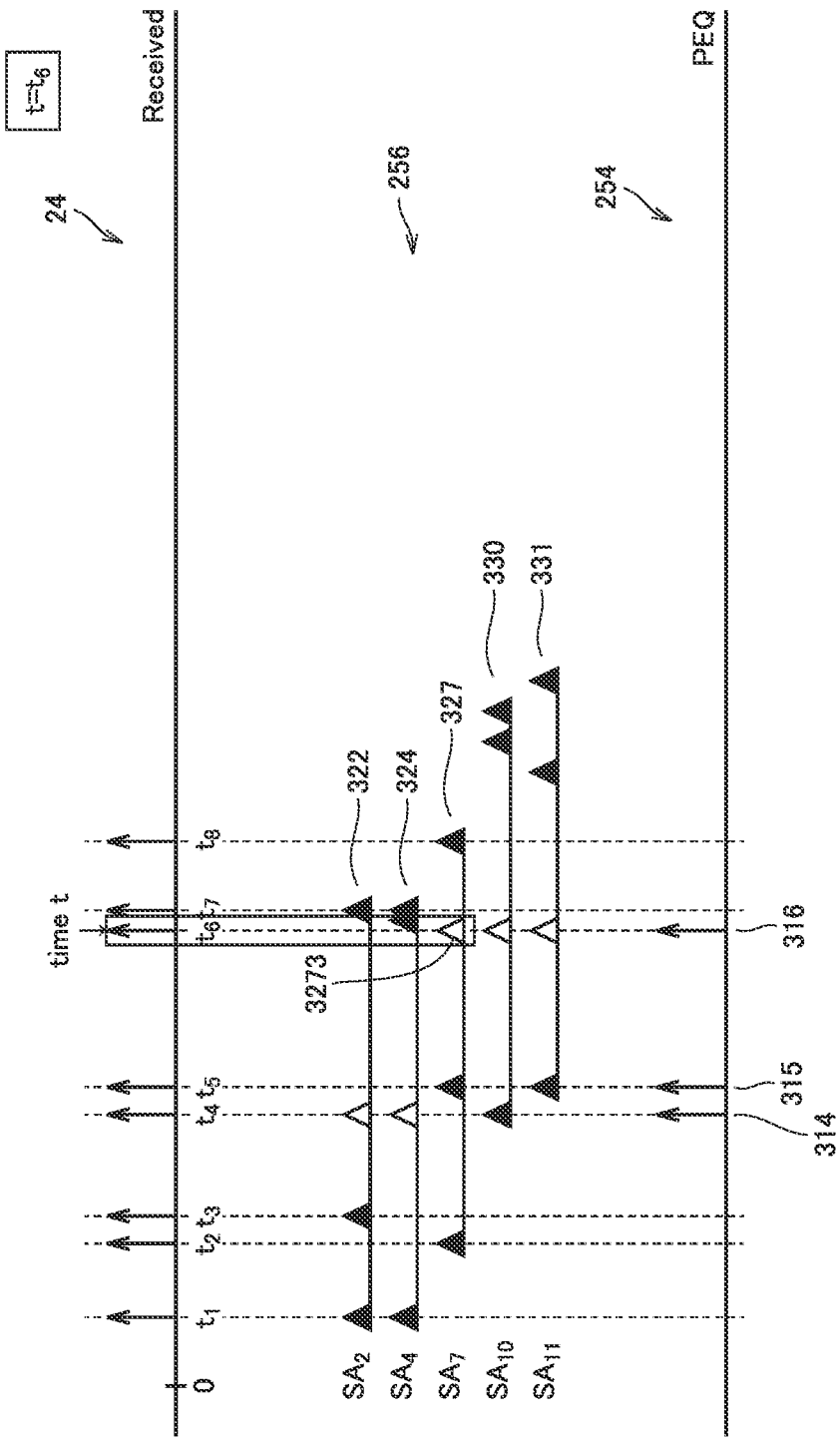
FIG. 21 is a time chart for illustrating exemplary processing for decoding a plurality of messages in accordance with the communication method according to the present embodiment (time t=$t_6$).

FIGS. 20 and 21 show a state at time $t=t_6$. A sixth pulse event 316 occurs at time $t_6$. Pulse event 316 is registered in pulse event queue 254.

Referring to FIG. 20, none of spike time 3224 or spike automaton 322, spike time 3243 of spike automaton 324, spike time 3253 of spike automaton 325, spike time 3263 of spike automaton 326, a spike time 3283 of spike automaton 328, and a spike lime 3293 of spike automaton 329 matches with pulse event 316.

Since there is a zero probability of occurrence of a pulse event that matches with spike time 3253 of spike automaton 325, spike automaton 325 is deleted from automaton queue 256. Similarly, since there is a zero probability of occurrence of a pulse event that matches with spike time 3263 of spike automaton 326, spike automaton 326 is also deleted from automaton queue 256. Similarly, since there is a zero probability of occurrence of a pulse event that matches with spike time 3283 of spike automaton 328, spike automaton 328 is also deleted from automaton queue 256. Similarly, since there is a zero probability of occurrence of a pulse event that matches with spike time 3293 of spike automaton 329, spike automaton 329 is also deleted from automaton queue 256.

Since the probability for the spike time of spike automaton 322 and spike automaton 324 to match with a pulse event that may occur in the future is non-zero, spike automaton 322 and spike automaton 324 are not deleted.

Since spike time 3273 of spike automaton 327 matches with pulse event 316, the condition for transition to the next state is satisfied. Therefore, spike automaton 327 makes transition to the next state.

Since time $t_3$ came more than ½ of message temporal length C before time $t_6$ as the reference, it is confirmed that pulse event 313 is not necessary for determination as to generation of a spike automaton. Therefore, pulse event 313 that occurred at time $t_3$ is deleted from pulse event queue 254.

Referring to FIG. 21, in addition to deletion of a spike automaton, update of the state of the spike automaton, and deletion of a pulse event as described above, a new spike automaton is generated.

In the example shown in FIG. 21, a spike automaton 330 is generated based on pulse events 314 and 316 (that occur at time $t_4$ and time $t_6$, respectively). Similarly, a spike automaton 331 is generated based on pulse events 315 and 316 (that occur at time $t_5$ and time $t_6$, respectively).

(f8: time $t=t_7$)

Figure 22:
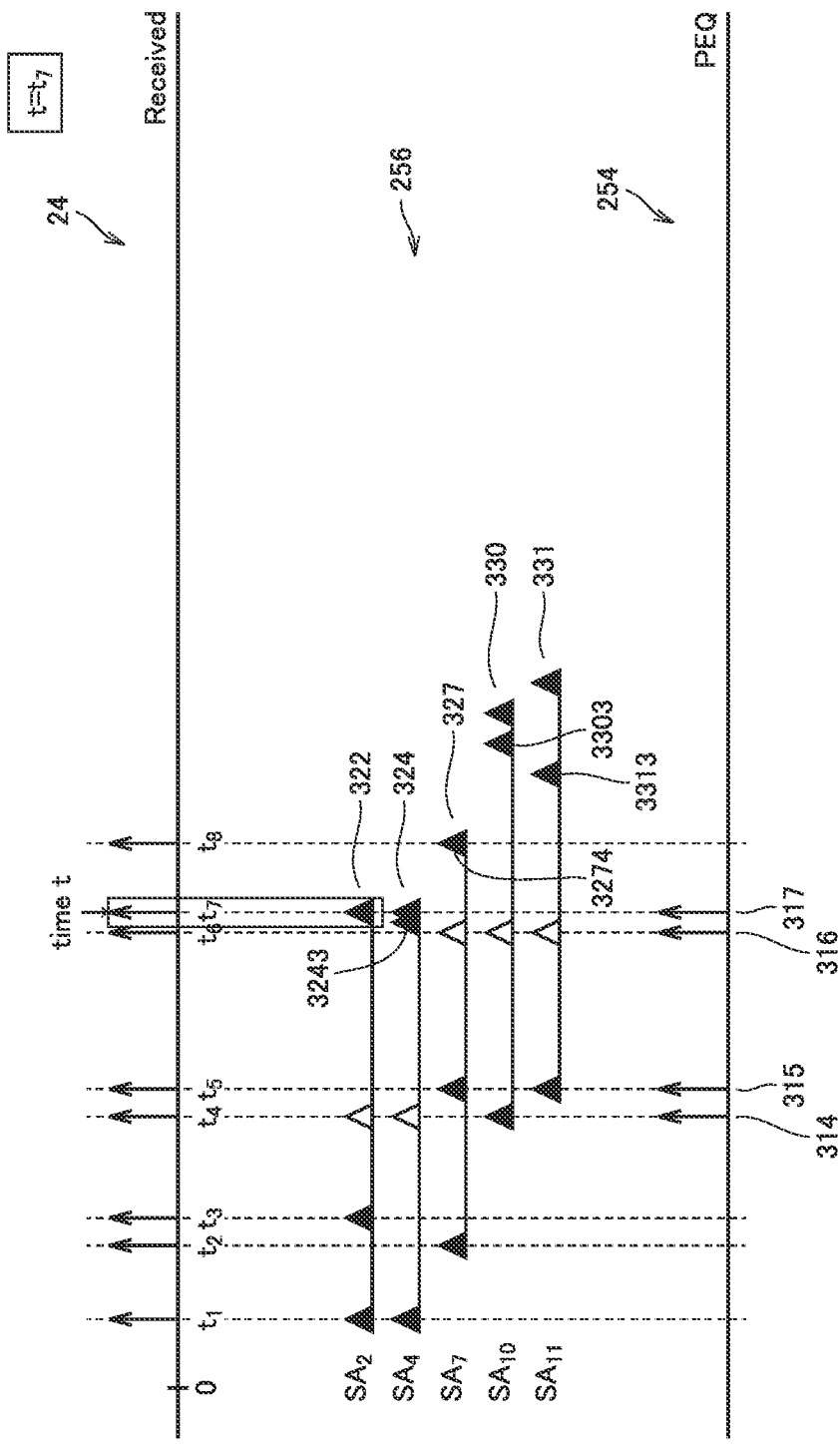
FIG. 22 is a lime chart for illustrating exemplary processing for decoding a plurality of messages in accordance with the communication method according to the present embodiment (time t-$t_7$).
Figure 23:
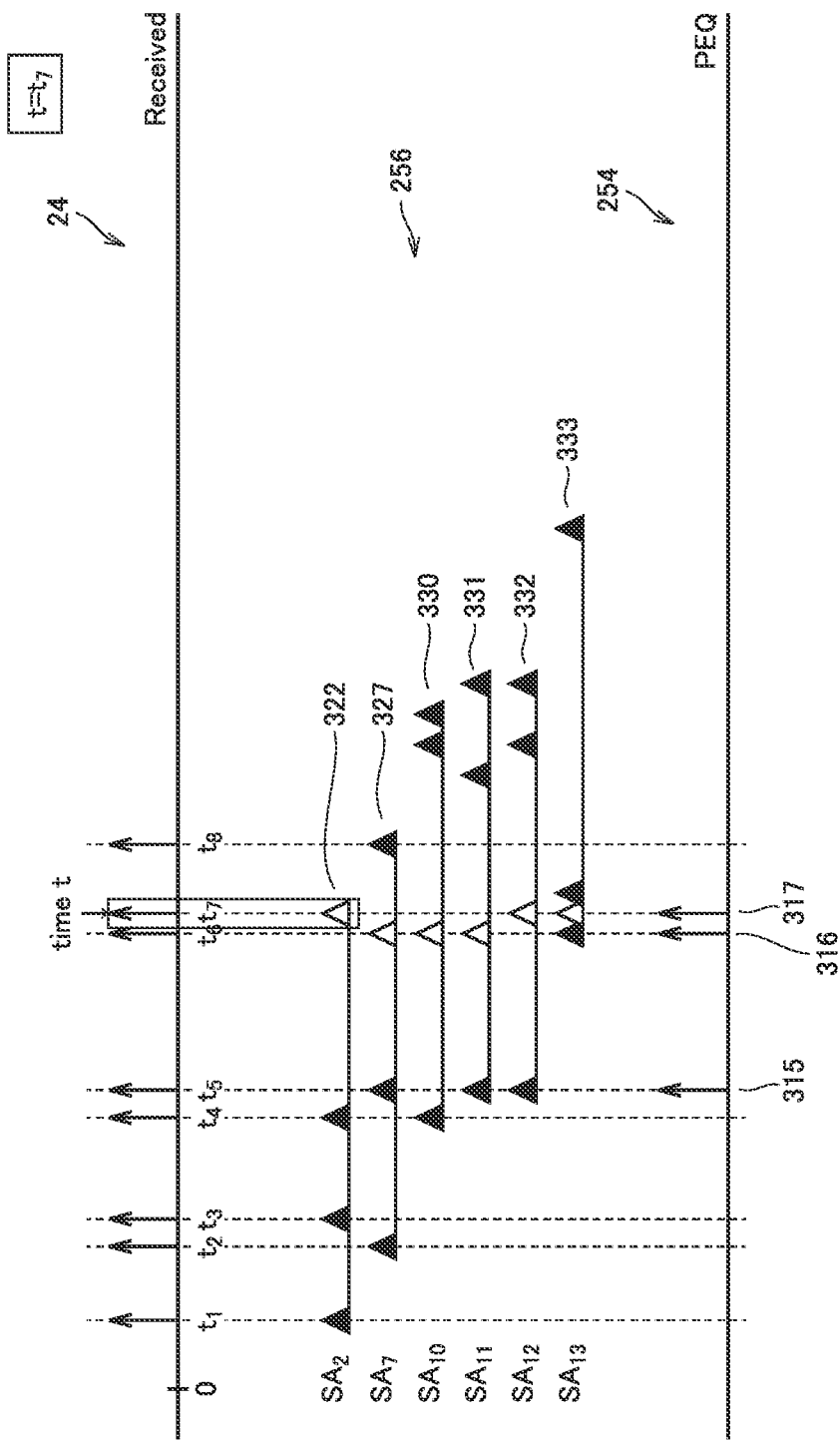
FIG. 23 is a time chart for illustrating exemplary processing for decoding a plurality of messages in accordance with the communication method according to the present embodiment (time t=$t_7$).

FIGS. 22 and 23 show a state at time $t=t_7$. A seventh pulse event 317 occurs at time $t_7$. Pulse event 317 is registered in pulse event queue 254.

Referring to FIG. 22, none of spike time 3243 of spike automaton 324, a spike time 3274 of spike automaton 327, a spike time 3303 of spike automaton 330, and a spike time 3313 of spike automaton 331 matches with pulse event 317.

Since the probability for the spike times of all spike automatons to match with a pulse event that may occur in the future is non-zero, the spike automatons are not deleted.

Since spike time 3224 of spike automaton 322 matches with pulse event 317, the condition for transition to the next step is satisfied. Therefore, spike automaton 322 makes transition to the next state, which means that spike automaton 322 has reached the last acceptance state, and message 301 corresponding to spike automaton 322 is reconstructed.

Since time $t_4$ came more than ½ of message temporal length C before time $t_6$ as the reference, it is confirmed that pulse event 314 is not necessary for determination as to generation of a spike automaton. Therefore, pulse event 314 that occurred at time $t_4$ is deleted from pulse event queue 254.

Referring to FIG. 23, in addition to update of the state of the spike automaton and deletion of the pulse event as described above, a new spike automaton is generated.

In the example shown in FIG. 23, a spike automaton 332 is generated based on pulse events 315 and 317 (that occur at time $t_5$ and time $t_7$, respectively). Similarly, a spike automaton 333 is generated based on pulse events 316 and 317 (that occur at time $t_6$ and time $t_7$, respectively).

(f9: time $t=t_8$)

Figure 24:
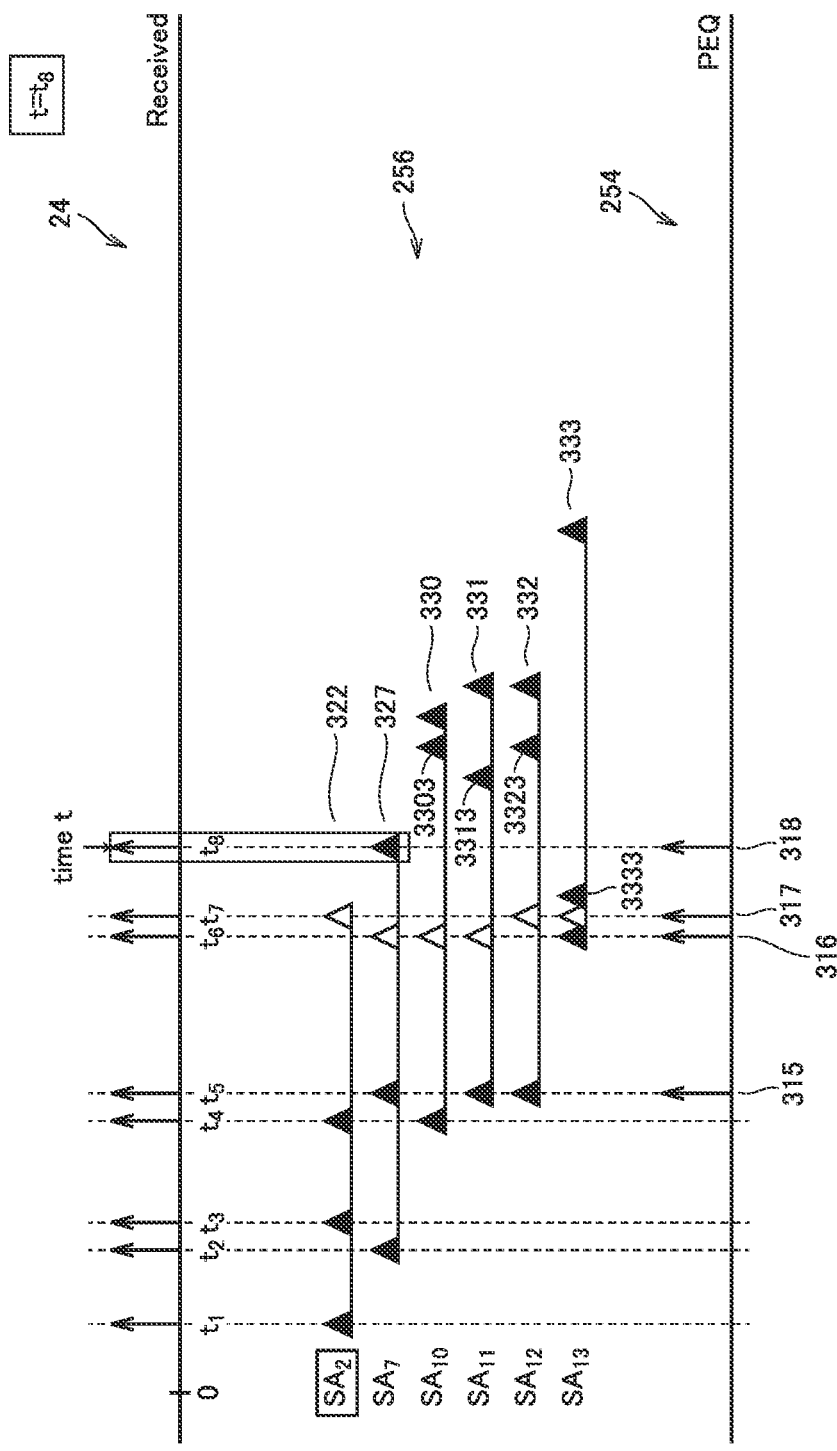
FIG. 24 is a time chart for illustrating exemplary processing for decoding a plurality of messages in accordance with the communication method according to the present embodiment (time t=$t_8$).
Figure 25:
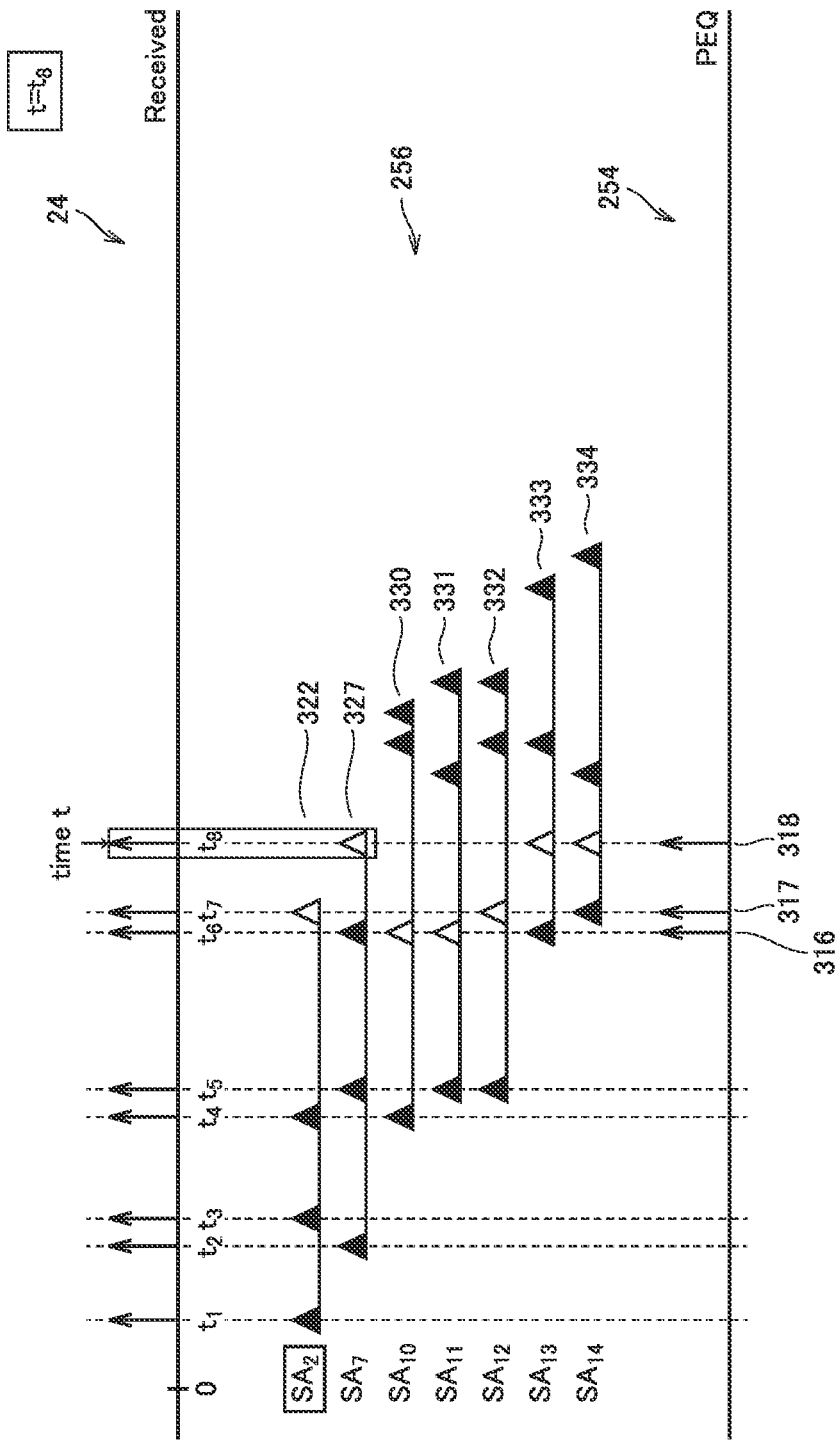
FIG. 25 is a time chart for illustrating exemplary processing for decoding a plurality of messages in accordance with the communication method according to the present embodiment (time t-$t_8$).

FIGS. 24 and 25 show a state at time $t=t_8$. An eighth pulse event 318 occurs at time $t_8$. Pulse event 318 is registered in pulse event queue 254.

Referring to FIG. 24, none of spike time 3303 of spike automaton 330, spike time 3313 of spike automaton 331, a spike time 3323 or spike automaton 332, and a spike time 3333 of spike automaton 333 matches with pulse event 318.

Since there is a zero probability of occurrence of a pulse event that matches with spike time 3333 of spike automaton 333, spike automaton 333 is deleted from automaton queue 256.

Since the probability for the spike times of spike automaton 327, spike automaton 330, spike automaton 331, spike automaton 332, and spike automaton 333 to match with a pulse event that may occur in the future is non-zero, spike automaton 327, spike automaton 330, spike automaton 331, spike automaton 332, and spike automaton 333 are not deleted.

Since spike time 3274 of spike automaton 327 matches with pulse event. 318, the condition for transition to the next state is satisfied. Therefore, spike automaton 327 makes transition to the next state, which means that spike automaton 327 has reached the last acceptance state, and message 302 corresponding to spike automaton 327 is reconstructed.

Since time $t_5$ came more than ½ of message temporal length C before time $t_8$ as the reference, it is confirmed that pulse event 315 is not necessary for determination as to generation of a spike automaton. Therefore, pulse event 315 that occurred at time $t_5$ is deleted from pulse event queue 254.

Referring to FIG. 25, in addition to update of the state of the spike automaton and deletion of the pulse event as described above, a new spike automaton is generated.

In the example shown in FIG. 25, spike automaton 333 is generated based on pulse events 316 and 318 (that occur at time $t_6$ and time $t_8$, respectively). Similarly, a spike automaton 334 is generated based on pulse events 317 and 318 (that occur at time $t_7$ and time $t_8$, respectively).

(f10: time $t>t_8$)

Figure 26:
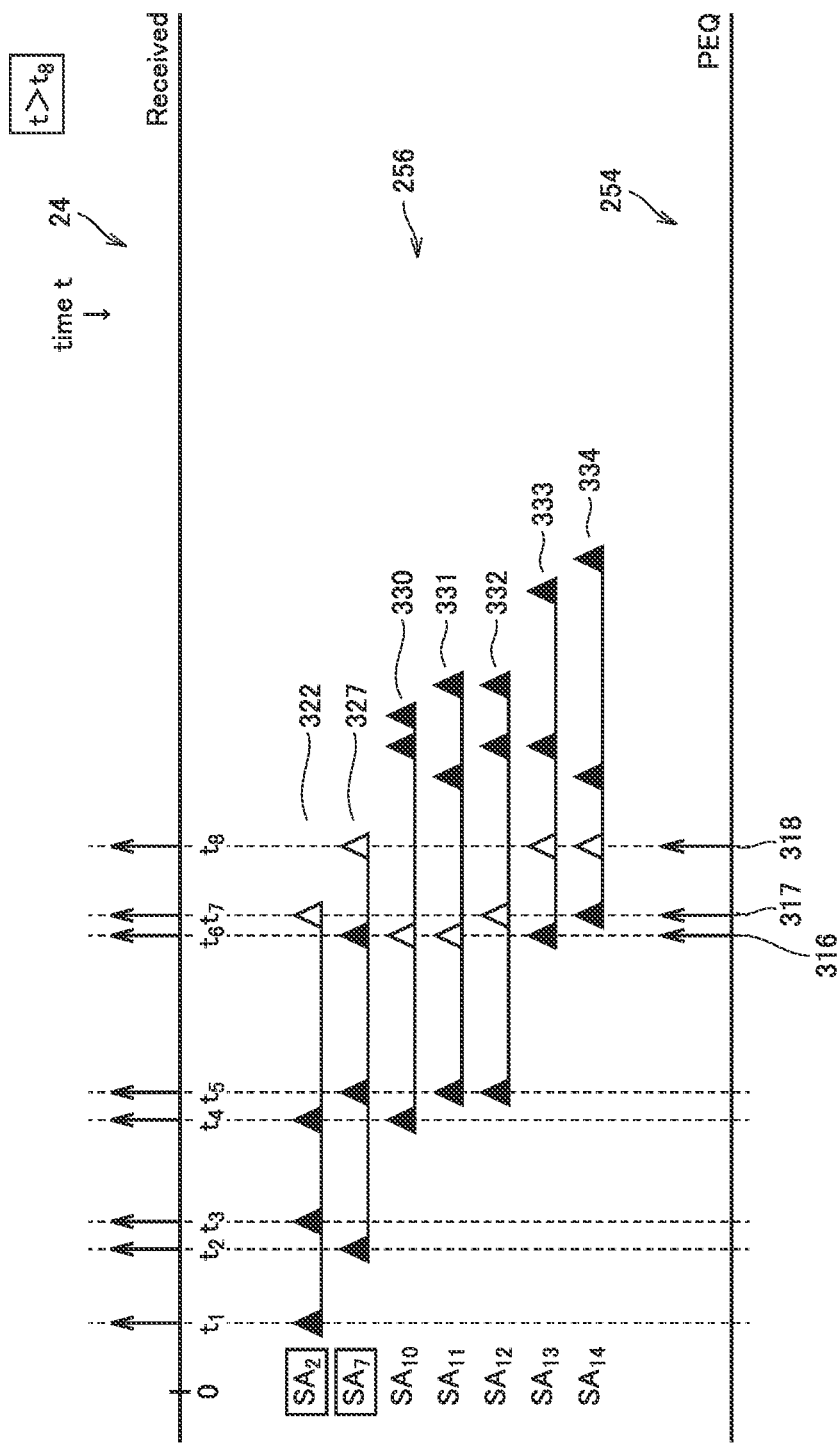
FIG. 26 is a time chart for illustrating exemplary processing for decoding a plurality of messages in accordance with the communication method according to the present embodiment (time t>$t_8$).
Figure 27:
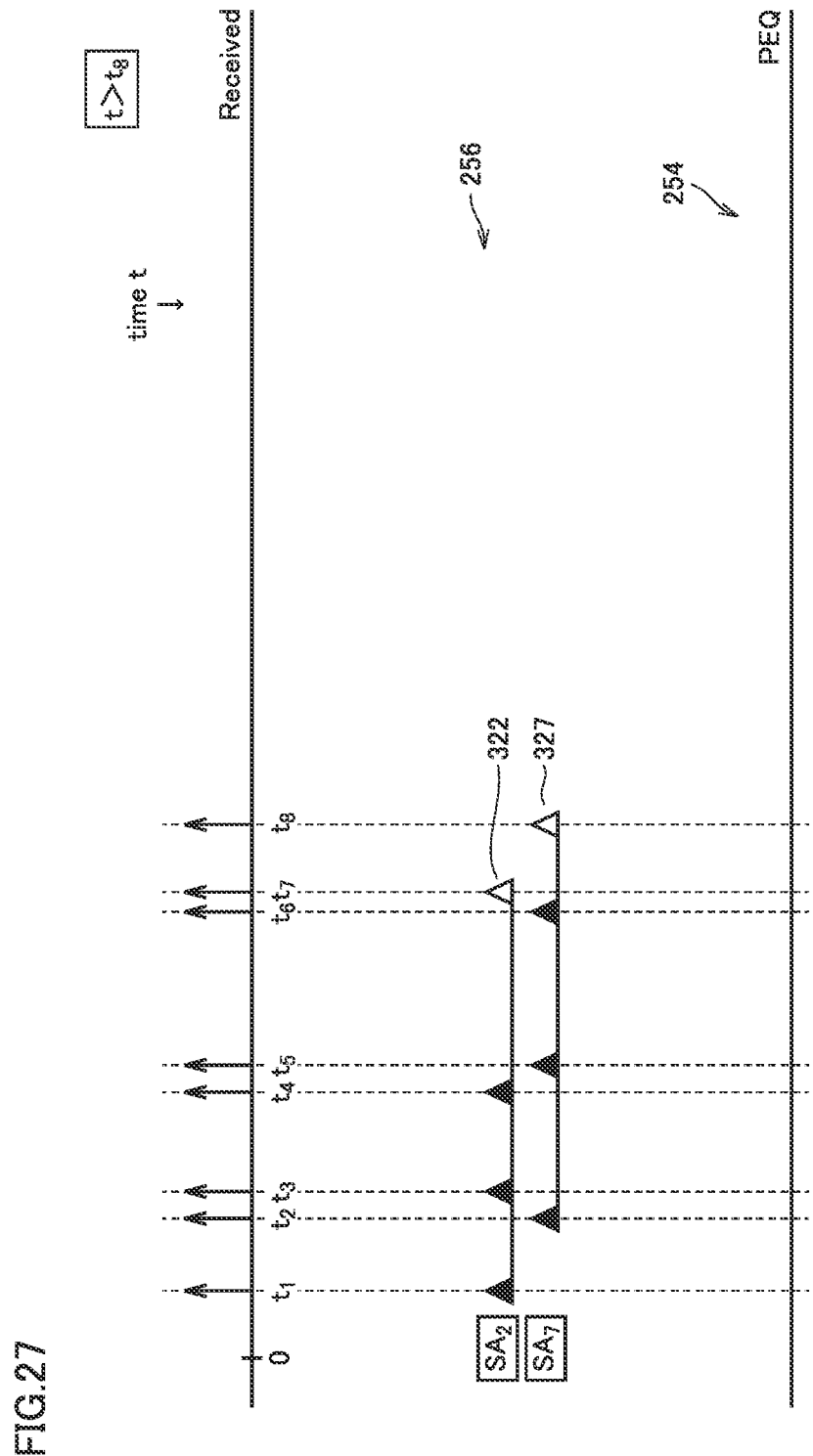
FIG. 27 is a time chart for illustrating exemplary processing for decoding a plurality of messages in accordance with the communication method according to the present embodiment (time t>$t_8$).

FIGS. 26 and 27 show a state at time $t>t_8$. In the example shown in FIGS. 26 and 27, no event pulse occurs al time $t_8$ or later. Therefore, no spike time of remaining spike automatons except for spike automaton 322 and spike automaton 327 that have reached the acceptance state is satisfied.

Spike automatons 330, 331, 332, 333, and 334 shown in FIG. 26 are deleted from automaton queue 256 after lapse of a sufficient time period. Similarly, pulse events 316, 317, and 318 are also deleted from pulse event queue 254. Finally, as shown in FIG. 27, spike automatons 322 and 327 are confirmed and they are reconstructed as messages 301 and 302, respectively.

G. Continuous Time/Discrete Time

Though the time interval contained in a message is the continuous time in the description above, in an actual implementation, the time interval is often set as a discrete time. In this case, a discrete time system resulting from equal division of message temporal length C into a plurality of time slots is adopted.

Figure 28:
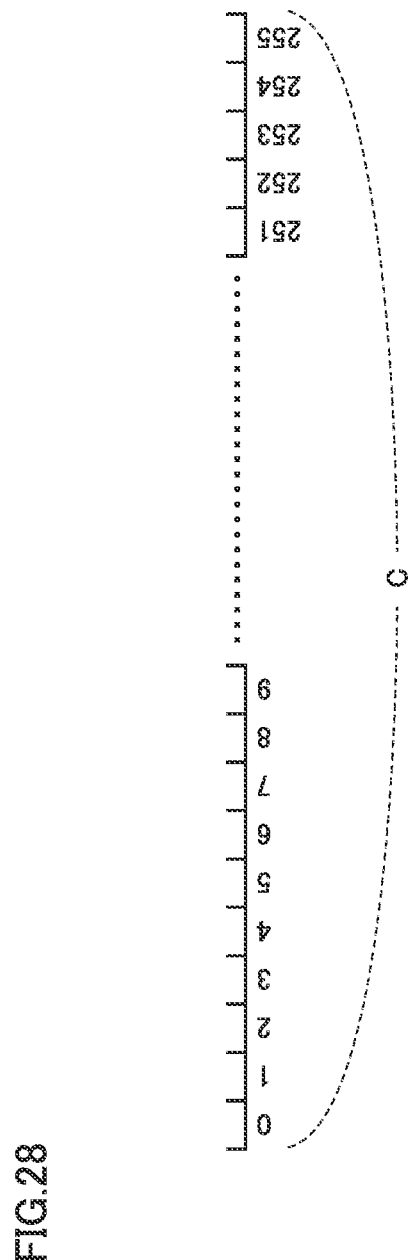
FIG. 28 is a schematic diagram showing an example where a message temporal length C is equally divided into 256 time slots in the communication method according to the present embodiment.

FIG. 28 is a schematic diagram showing an example where message temporal length C is equally divided into 256 time slots in the communication method according to the present embodiment. When the x/x/C-2x code format is applied in division into 256 time slots as shown in FIG. 28, x ranges from 0 to 126 and values in 127 levels can be encoded. In other words, values that can be expressed with four pulses in a message constituted of 256 time slots ranges from "0" to "126".

For example, when a value "0" is encoded, pulses are present at a "0th" position, a "1st" position, a "2nd" position, and a "255th" position, respectively. When a value "126" is encoded, pulses are present at the "0th" position, a "127th" position, a "254th" position, and the "255"th position, respectively. The range of values cart be normalized as appropriate, so, for example, the range can be a range from "–63" to "63" instead of the range from "0" to "126".

The number of divided time slots of message temporal length C can be set as appropriate in accordance with a temporal resolution at a reception-side node.

In a continuous time system, the probability that pulses transmitted from two statistically independent nodes erroneously satisfy the x/x/C-2x code format can be regarded as substantially zero. In particular when the number of divided time slots is small in the discrete time system as shown in FIG. 28, however, there is a non-zero probability of incorrect decoding.

Figure 29:
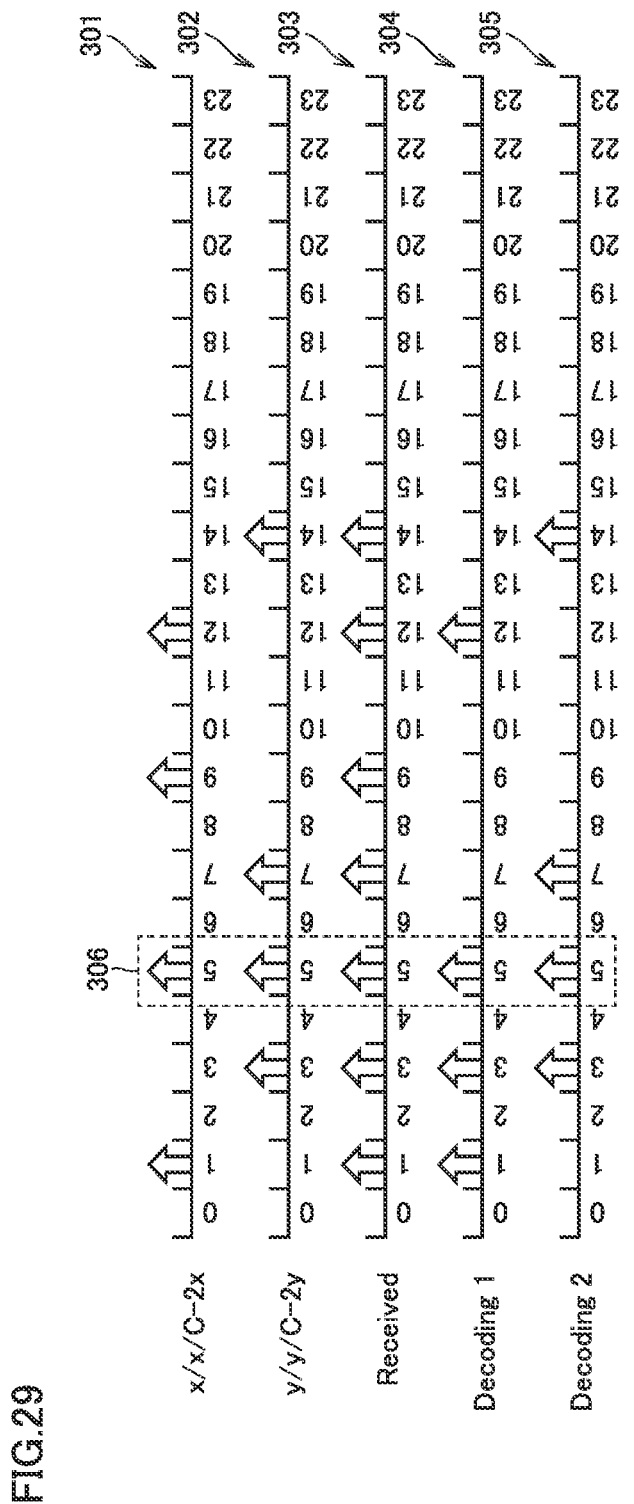
FIG. 29 is a diagram for illustrating exemplary processing in which decoding is incorrect in the communication method according to the present embodiment.

FIG. 29 is a diagram for illustrating exemplary processing in which decoding is incorrect in the communication method according to the present embodiment. FIG. 29 shows an example of equal division of message temporal length C into 24 time slots.

In FIG. 29, message temporal length C includes ten time slots, message 301 results from encoding of a value "1", and message 302 results from encoding of a value "3".

Reception pulse train 303 corresponds to a pulse train generated from message 301 and a pulse train generated from message 302 as being superimposed on each other. In the example shown in FIG. 29, pulses of the messages are present in an identical time slot in a collision section 306.

Result of decoding 304 and result of decoding 305 represent exemplary message candidates extracted from reception pulse train 303. It can be seen that result of decoding 305 matches with contents in message 302 and it was successfully correctly decoded, whereas result of decoding 304 does not match with contents in message 301 and it was incorrectly decoded.

In order to lower uncertainty as described above, random sleep as below may be applied.

Figure 30:
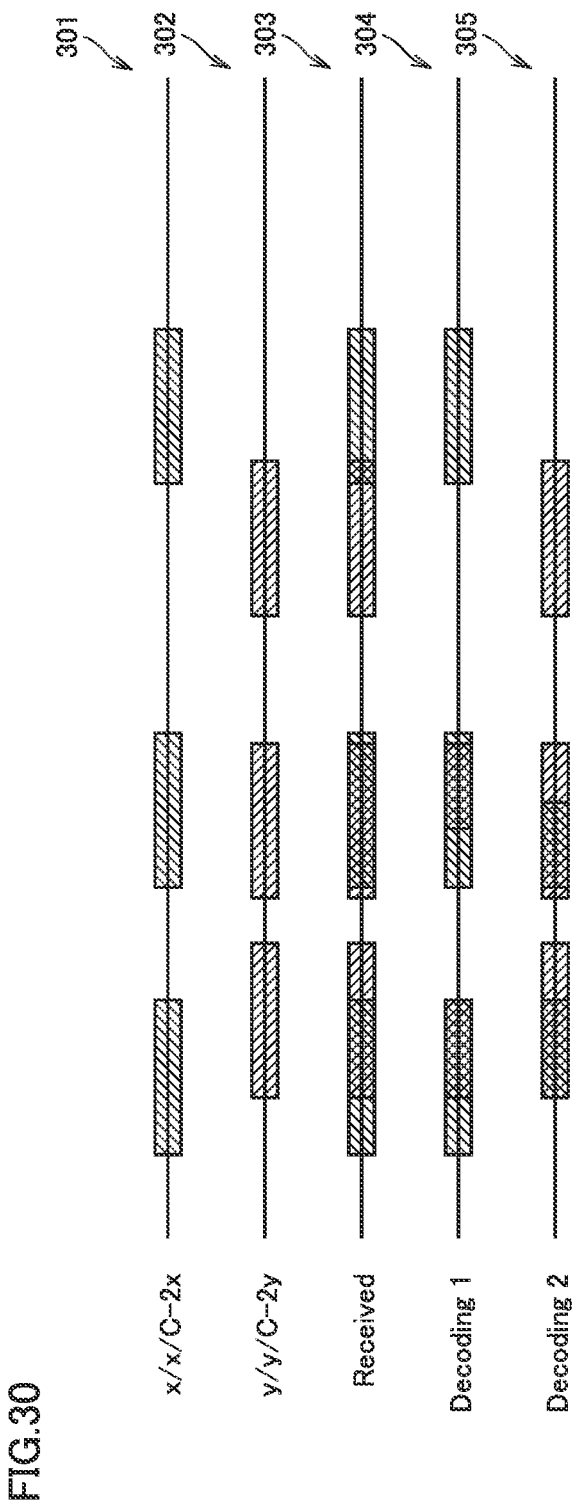
FIG. 30 is a diagram for illustrating random sleep in the communication method according to the present embodiment.

FIG. 30 is a diagram for illustrating random sleep in the communication method according to the present embodiment. In exemplary processing shown in FIG. 30, a message is transmitted a plurality of times. By way of example, message 301 and message 302 are each transmitted three times. At this time, an interval of transmission of the identical message (sleep time period) is randomly set.

Since the sleep time period is thus randomly set, in reception pulse train 303, a case of reception of message 301 and message 302 substantially superimposed on each other and a case substantially without superimposition of message 301 and message 302 on each other may occur. In result of decoding 304 and result of decoding 305 obtained by transmission of the message three times, the messages can correctly be decoded.

Thus, the sender node may further perform processing for transmitting a message indicating identical value x a plurality of times. In the processing for transmitting the message a plurality of times, a time interval from transmission of a preceding message until transmission of a next message may randomly be determined.

By making use of random characteristics as described above, the probability of incorrect decoding of a message as described above can be lowered. Namely, the uncertainty is lowered by the transmission of a message a plurality of times. Such lowering in uncertainty is realized by randomly setting a stand-by time period (sleep time period) until sending an identical message again after transmission of each message.

So long as randomness is sufficiently ensured, the number of times of resending does not have to be so large and overhead involved with transmission of a message a plurality of times can be suppressed.

The sleep time period shown in FIG. 30 may be set as a reception period for receiving a signal from another node. Namely, at each node, alternate switching between a reception period and a transmission period is made and a length of the reception period may randomly be changed.

H. Identification of Network Based on Message Temporal Length

As described above, in the communication method according to the present embodiment, multiplexed transmission is realized based on a time interval corresponding to a value indicated in a message and a message temporal length. In other words, by differently setting a message temporal length, a network independent of a node of another message temporal length can be configured.

Figure 31:
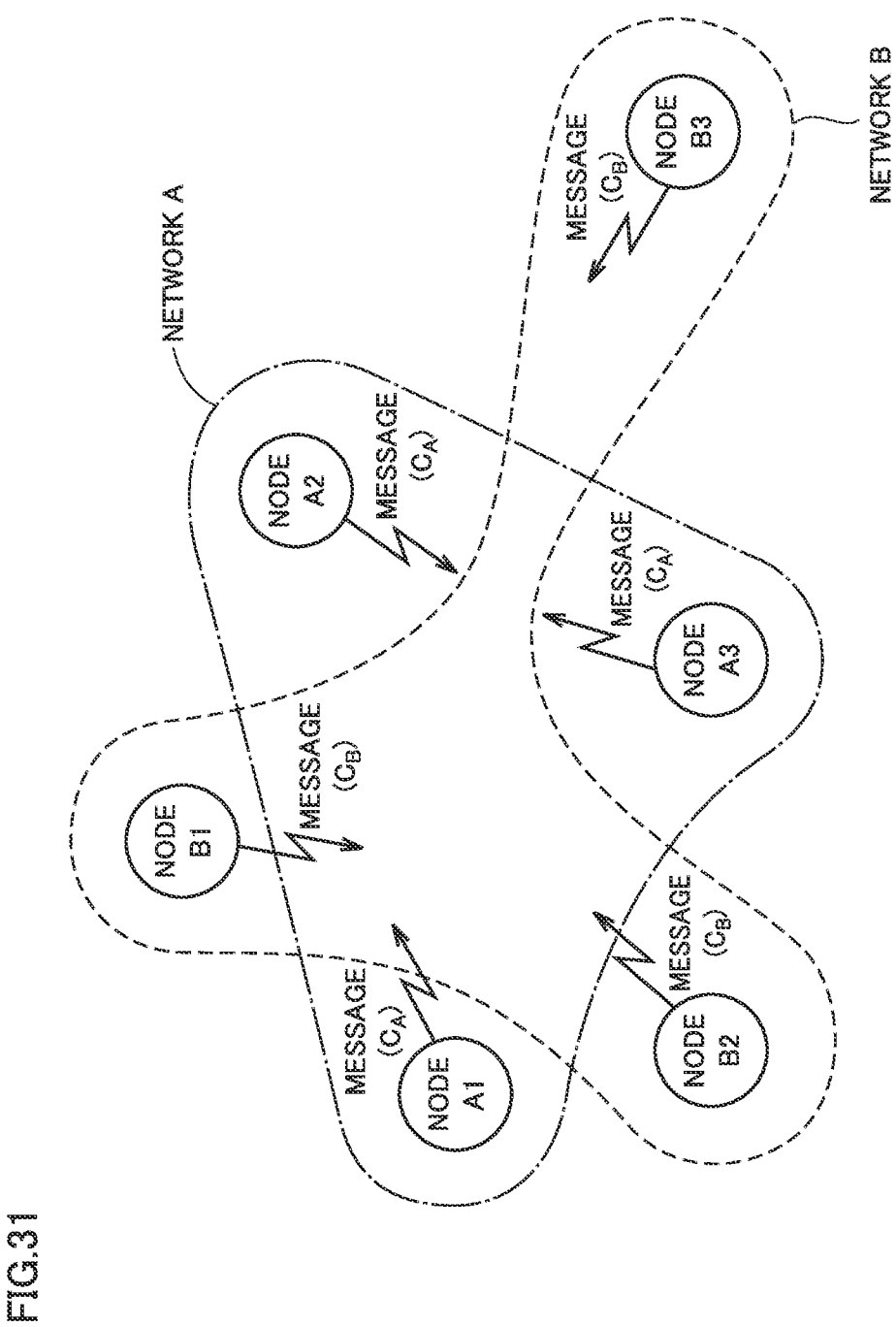
FIG. 31 is a schematic diagram showing another exemplary network system that adopts the communication method according to the present embodiment.

FIG. 31 is a schematic diagram showing another exemplary network system that adopts the communication method according to the present embodiment. FIG. 31 shows an example where nodes A1 to A3 and nodes B1 to B3 are present in proximity. Nodes A1 to A3 configure a network A that generates a message of a message temporal length $C_A$ and nodes B1 to B3 configure a network B that generates a message of a message temporal length $C_B$.

By differently setting message temporal length C, a message transmitted from a node belonging to another network is not correctly reproduced. Therefore, even though signals each including a pulse train are simultaneously transmitted, a message can be exchanged between nodes belonging to the same network.

I. Additional Aspects

The present embodiment encompasses a technical concept as below.

(1) A method of encoding a message based on a pulse, in which functional relation is defined among time intervals between pulses in each message.

(2) A method of encoding a message based on a pulse, in which each message is defined by four successive pulses $P_1$, $P_2$, $P_3$, and $P_4$. For value x encoded as the message, time intervals between pulses $I_{12}$ [$P_1$, $P_2$], $I_{23}$ [$P_2$, $P_3$], and $I_{34}$ [$P_3$, $P_4$] satisfy relation of $I_{12}$-f(x), $I_{23}$-g(x), and $I_{34}$-C-f(x)-g(x).

(3) A method of encoding a message based on a pulse, in which each message is defined by four successive pulses $P_1$, $P_2$, $P_3$, and $P_4$. For value x encoded as the message, time intervals between pulses $I_{12}$[$P_1$, $P_2$], $I_{23}$[$P_2$, $P_3$], and $I_{34}$ [$P_3$, $P_4$] satisfy relation of $I_{12}$=f(x), $I_{23}$=g(x), and $I_{34}$=C-f(x)-g(x), and f(x) and g(x) are a monotonously increasing function or a monotonously decreasing function with respect to x.

(4) A method of encoding a message based on a pulse, in which each message is defined by four successive pulses $P_1$, $P_2$, $P_3$, and $P_4$. For value x encoded as the message, time intervals between pulses $I_{12}$ [$P_1$, $P_2$], $I_{23}$ [$P_2$, $P_3$], and $I_{34}$ [$P_3$, $P_4$] satisfy relation $I_{12}$-x, $I_{23}$-x, and $I_{34}$-C-2x.

(5) A method of encoding a message based on a pulse, in which functional relation among time intervals between pulses is defined in each message and an interval between a first pulse and a last pulse has message temporal length C set to a fixed value.

(6) A method of encoding a message based on a pulse, in which each message is defined by four successive pulses $P_1$, $P_2$, $P_3$, and $P_4$. For value x encoded as the message, time intervals between pulses $I_{12}$ [$P_1$, $P_2$], $I_{23}$ [$P_2$, $P_3$], and $I_{34}$ [$P_3$, $P_4$] satisfy relation of $I_{12}$=f(x), $I_{23}$=C-f(x)-g(x), and $I_{34}$=g(x).

(7) A method of encoding a message based on a pulse, in which each message is defined by four successive pulses $P_1$, $P_2$, $P_3$, and $P_4$. For value x encoded as the message, time intervals between pulses $I_{12}$ [$P_1$, $P_2$], $I_{23}$ [$P_2$, $P_3$], and $I_{34}$ [$P_3$, $P_4$] satisfy relation of $I_{12}$=f(x), $I_{23}$=C-f(x)-g(x), and $I_{34}$=g(x), and f(x) and g(x) are a monotonously increasing function or a monotonously decreasing function with respect to x.

(8) A method of encoding a message based on a pulse, in which each message is defined by four successive pulses $P_1$, $P_2$, $P_3$, and $P_4$. For value x encoded as the message, time intervals between pulses $I_{12}$ [$P_1$, $P_2$], $I_{23}$ [$P_2$, $P_3$], and $I_{34}$ [$P_3$, $P_4$] satisfy relation of $I_{12}$=x, $I_{23}$=C-2x, and $I_{34}$=x.

(9) A method of encoding a message based on a pulse, in which each message is defined by four successive pulses $P_1$, $P_2$, $P_3$, and $P_4$. For value x encoded as the message, time intervals between pulses $I_{12}$ [$P_3$, $P_2$], $I_{23}$ [$P_2$, $P_3$], and $I_{34}$ [$P_3$, $P_4$] satisfy relation of $I_{12}$=C-f(x)-g(x), $I_{23}$=f(x), and $I_{34}$=g(x).

(10) A method of encoding a message based on a pulse, in which each message is defined by four successive pulses $P_1$, $P_2$, $P_3$, and $P_4$. For value x encoded as the message, time intervals between pulses $I_{12}$ [$P_1$, $P_2$], $I_{23}$ [$P_2$, $P_3$], and $I_{34}$[$P_3$, $P_4$] satisfy relation of $I_{12}$=C-f(x)-g(x), $I_{23}$=f(x), and $I_{34}$=g(x), and f(x) and g(x) are a monotonously increasing function or a monotonously decreasing function with respect to x.

(11) A method of encoding a message based on a pulse, in which each message is defined by four successive pulses $P_1$, $P_2$, $P_3$, and $P_4$. For value x encoded as the message, time intervals between pulses $I_{12}$ [$P_1$, $P_2$], $I_{23}$ [$P_2$, $P_3$], and $I_{34}$ [$P_3$, $P_4$] satisfy relation of $I_{12}$=C-2x, $I_{23}$=x, and $I_{34}$=x.

(12) The time interval between pulses is set as a continuous time.

(13) The time interval between pulses is set as a discrete time at a prescribed temporal resolution.

(14) An algorithm that decodes a message even in each of a case where a plurality of messages are temporally superimposed on each other, a ease where collision between messages occurs, a case where an unintended pulse is introduced under the influence by noise, and a case where an initial pulse is missing under the influence by noise.

(15) A method of lowering uncertainty in decoding of a message on a reception side by randomly setting a time interval between a plurality of times of successive transmission of an identical message from each node.

(16) A method of reliably decoding a transmitted message by repeatedly executing an algorithm that decodes each message on a reception-side node by randomly setting a time interval in transmission of an identical message a plurality of times from another node.

J. Advantages

In the present embodiment, information is encoded by using a time interval between two successive pulses. In particular, in the present embodiment, rather than applying error correction coding to convert information into a binary-code word before conversion of the information into a series of pulse trains, information is directly encoded into pulses for more efficient recovery from collision.

An error correctable degree is dependent on the number of pulses used for encoding information. In a typical embodiment, a pulse train in which a time interval between a pair of pulses has constant message temporal length C is used. The pulse train is arranged such that the time interval between the pulses correlate with each other in the pair of pulses.

An example in which, when a pulse train including pulses $P_1$, $P_2$, $P_3$, and $P_4$ generated at spike times $st_1$, $st_2$, $st_3$, and $st_4$ is used, relation of $st_2-st_1=st_3-st_2$ and $st_4-st_1-C$ is satisfied is given as the simplest form of such encoding. Spike times $st_1$, $st_2$, and $st_3$ are selected so as to satisfy relation of $st_2-st_1=st_3-st_2<C/2$.

A message generated by such encoding is a frame having message temporal length C, and includes pulse $P_1$ referred to as an "anchor" representing start of the frame, pulse $P_4$ representing "end" of the frame, and two pulses $P_2$ and $P_3$ defining two equal time intervals within the frame.

In order to make a message more robust against an error, a pulse may further be arranged within the frame. For example, by adding a pulse to one frame, an identical value may repeatedly be encoded a plurality of times.

Message temporal length C between the pair of pulses allows identification of a pulse that should serve as an anchor of a frame even though a pulse from another node is introduced. Furthermore, decoding processing can be redundant by transmitting a message a plurality of times. Therefore, even though collision occurs due to transmission of messages from a plurality of nodes, original information can be reproduced.

The communication method according to the present embodiment provides an algorithm that allows accurate reproduction of the original information, even if some kind of collision occurs. The algorithm that reproduces information extracts a plurality of candidates that can be a message resulting from encoding of some kind of information from an observed pulse train. Each time a pulse is received, a plurality of candidates that may be a message (frame) may be produced. Therefore, a message may additionally be transmitted a prescribed number of times after a randomly determined sleep time period. Use of such a randomly determined sleep time period achieves an effect to reduce the number of candidates for reproducing a message with increase in number of times of transmission.

In the communication method according to the present embodiment, a randomly determined sleep time period is used. Therefore, the original information can be reproduced with a small number of times of resending. Even if a collision occurs, the probability that resending a message is necessary can be lowered.

In a communication scheme according to the present embodiment, a time interval between successive pulses is ideally a continuous time. In an actual implementation, however, an error or a jitter of timing of a pulse occurs and hence a discrete time should be used. Use of the discrete time may bring about more reproduction possibilities in decoding processing and consequently there may be a non-zero probability of incorrect decoding of a message. Such a non-zero probability of an error, however, can be lowered to a practically unproblematic level.

In the communication scheme according to the present embodiment, a transmission node and a reception node do not have to be in synchronization with each other but they can asynchronously operate. Such an asynchronous operation serves for random determination of a time interval from transmission of a preceding message until transmission of a next message in transmission of an identical message a plurality of times. Since the communication scheme according to the present embodiment adopts an asynchronous operation, it is suitable for non-coherent impulse radio UWB.

In assuming an application of the communication scheme according to the present embodiment, for example, for implementation of Internet of things (IoT), conceptual reconsideration for exploiting the full potential of daily small things is required. Sensing is assumed to be carried out at much higher density than in a conventional concept, which means that a large number of nodes that interact with one another at a relatively short distance are required.

As the number of nodes becomes very large, it becomes impossible to frequently charge a battery at each node and hence, an amount of energy consumption at each node should be very small. Since interference with an existing radio technology (for example, narrow-band radio) is also expected, a new encoding and error correction method and a new signal processing method are required for minimizing such interference. For example, interference can be minimized by employing broadcasting at low power at a small distance between nodes. In order to achieve further suppression of interference, however, introduction of impulse type communication such as non-coherent impulse radio UWB is expected to be indispensable.

In the communication scheme according to the present embodiment, as in signal transmission in the brain, a pulse train (spike train) is used for communication between nodes so that an amount of energy consumption can be very small.

By way of example, the communication scheme according to the present embodiment is useful in a wireless application in which a high bit rate is not necessarily required in communication with another node while low power consumption is maintained. Typical examples of such a wireless application include personal area network (PAN), body area network (BAN), a wireless sensor network including a large number of low-cost nodes, and an RFID tag capable of operating in an active mode or a tag adopting near field communication (NFC) based on non-coherent impulse radio.

The communication scheme is also applicable to disaster monitoring with a sensor node that can be developed by a flexible and cost-efficient method. In case of occurrence of large-scale disasters, network infrastructures may be exposed to danger or may be overloaded. Therefore, establishment of a sensor network independent of an existing network and promptly operable without much preparation is a matter of urgent necessity. The communication scheme according to the present embodiment is also compliant with requirements of such an application.

A core technology according to the present invention allows implementation of the Internet in which daily simple things are made intelligent by simple interaction.

For example, such a configuration in which user recognizable information is collectively transmitted when a user tries to search for a specific one thing among a large number of things, or such a configuration in which on-the-fly adaptation is required by a user like a shape of a hand, can be considered.

Medical monitoring with the use of things in daily lives can also be carried out. For example, a thing held in a user's hand or a thing worn by a user is very suitable for monitoring of a heart rate or a body temperature. Therefore, a technology for realizing an ambient environment can inexpensively be provided. In the long term, by using the core technology according to the present invention, a new application using ultra-high density monitoring with a very small and very inexpensive node can be provided. Examples of such a new application include management of diseases of plants and monitoring of water and nutrition in an agricultural field.

Without being limited to the applications described above, the core technology according to the present invention is applicable to any applications.

It should be understood that the embodiment disclosed herein is illustrative and non-restrictive in every respect. The scope of the present invention is defined by the terms of the claims rather than the description of the embodiment above and is intended to include any modifications within the scope and meaning equivalent to the terms of the claims.

REFERENCE SIGNS LIST

1 network system; 301, 302 message; 2 node; 4 application; 20 transmission and reception controller; 21 encoder; 22 transmission circuit; 23 antenna; 24 reception circuit; 25 decoder; 32, 321, 322, 323, 324, 325, 326, 327, 328, 329, 330, 331, 332, 333, 334 spike automaton; 50, 311, 312, 313, 314, 315, 316, 317, 318 pulse event; 251 pulse detector; 252 automaton manager; 253 counter; 254 pulse event queue; 255 message reproducer; 256 automaton queue; 258 register; 303 reception pulse train; 304, 305 result of decoding; 306 collision section; 3213, 3223, 3224, 3233, 3243, 3253, 3263, 3273, 3274, 3283, 3293, 3303, 3313, 3323, 3333 spike time; C message temporal length; ST, ST1, ST2, ST3, ST4 state

The invention claimed is:

1. A communication method of transmitting data between a plurality of nodes by a signal including a pulse train, the communication method comprising:
generating, at a first node, a message of a predetermined message temporal length that indicates an input value to be encoded; and
transmitting, at the first node, the signal including the pulse train corresponding to the generated message, wherein
the signal including the pulse train includes two pulses that define start and end of the message, respectively, and further two pulses that define within the message, a first time interval calculated from the input value in accordance with a first function and a second time interval calculated from the input value in accordance with a second function.

2. The communication method according to claim 1, further comprising reproducing at a second node, the message from the received signal including the pulse train, by determining a set of four pulses that matches in the first time interval, the second time interval, and the message temporal length with the received signal, in respect to time intervals defined by the four pulses.

3. The communication method according to claim 1, wherein
the first function and the second function are a monotonously increasing function or a monotonously decreasing function with respect to the input value.

4. The communication method according to claim 1, wherein
the first time interval and the second time interval are both set to an identical value that indicates the input value.

5. The communication method according to claim 1, further comprising transmitting, at the first node, a message indicating an identical input value a plurality of times, wherein
the transmitting the message the plurality of times includes randomly determining a time interval from transmission of a preceding message until transmission of a next message.

6. A network system that transmits data between a plurality of nodes by a signal including a pulse train, the network system comprising:
a first node that generates a message of a predetermined message temporal length that indicates an input value to be encoded; and
a second node that decodes the message transmitted from the first node, wherein
the first node transmits the signal including the pulse train corresponding to the generated message, and
the signal including the pulse train includes two pulses that define start and end of the message, respectively, and further two pulses that define within the message, a first time interval calculated from the input value in accordance with a first function and a second time interval calculated from the input value in accordance with a second function.

7. The network system according to claim 6, wherein the second node further reproduces the message from the received signal including the pulse train, by determining a set of four pulses that matches in the first time interval, the second time interval, and the message temporal length with the received signal, in respect to time intervals defined by the four pulses.

8. The network system according to claim 6, wherein
the first function and the second function are a monotonously increasing function or a monotonously decreasing function with respect to the input value.

9. The network system according to claim 6, wherein
the first time interval and the second time interval are both set to an identical value that indicates the input value.

10. The network system according to claim 6, wherein
the second node further transmits a message indicating an identical input value a plurality of times, and
when the second node transmits the message the plurality of times, a time interval from transmission of a preceding message until transmission of a next message is randomly determined.

* * * * *